(12) United States Patent
Maruyama et al.

(10) Patent No.: US 9,739,350 B2
(45) Date of Patent: Aug. 22, 2017

(54) BELT INSTALLATION JIG AND A BELT INSTALLATION METHOD USING SAME

(75) Inventors: Yuji Maruyama, Akashi (JP); Hiroki Takechi, Osaka (JP); Yasuhito Aoki, Tkashima (JP)

(73) Assignee: Mitsuboshi Belting Ltd. (JP)

( * ) Notice: Subject to any disclaimer, the term of this patent is extended or adjusted under 35 U.S.C. 154(b) by 1966 days.

(21) Appl. No.: 12/728,439

(22) Filed: Mar. 22, 2010

(65) Prior Publication Data

US 2010/0248878 A1    Sep. 30, 2010

(30) Foreign Application Priority Data

Mar. 26, 2009  (JP) .................................. 075309/2009
Jan. 29, 2010  (JP) .................................. 18003/2010

(51) Int. Cl.
*F16H 7/24* (2006.01)

(52) U.S. Cl.
CPC .......... *F16H 7/24* (2013.01); *Y10T 29/53657* (2015.01)

(58) Field of Classification Search
CPC ........................................................ F16H 7/24
USPC ................................... 474/148, 130; 29/235
See application file for complete search history.

(56) References Cited

U.S. PATENT DOCUMENTS

| | | | | |
|---|---|---|---|---|
| 315,615 | A * | 4/1885 | Harnsberger | 474/130 |
| 551,486 | A * | 12/1895 | Brion | 474/130 |
| 588,838 | A * | 8/1897 | Savage et al. | 474/130 |
| 1,158,737 | A * | 11/1915 | Spangelo | 474/130 |
| 2,499,173 | A * | 2/1950 | Taylor | 474/130 |
| 4,325,703 | A * | 4/1982 | Phillips | 474/130 |
| 6,402,649 | B1 * | 6/2002 | Amkreutz | 474/130 |
| 6,533,689 | B1 * | 3/2003 | Amkreutz | 474/130 |
| 6,692,391 | B2 * | 2/2004 | Gerring et al. | 474/130 |
| 6,783,473 | B2 * | 8/2004 | De Meester et al. | 474/130 |
| 7,048,663 | B2 * | 5/2006 | Riaudel | 474/130 |
| 7,056,244 | B2 * | 6/2006 | Hodjat | 474/130 |
| 7,211,015 | B2 * | 5/2007 | Shaw | 474/130 |
| 7,247,110 | B2 * | 7/2007 | Winninger et al. | 474/130 |
| 7,335,121 | B2 * | 2/2008 | Fletcher et al. | 474/130 |
| 2003/0211910 | A1 * | 11/2003 | Gerring et al. | 474/130 |

(Continued)

FOREIGN PATENT DOCUMENTS

JP    2006 300172 A    11/2006
JP    2006-300172 A    11/2006

(Continued)

OTHER PUBLICATIONS

European Search Report, dated Dec. 2, 2010, on European Patent Application No. EP 10 15 7568.
European Search Report for EP 10 15 7568.

*Primary Examiner* — Michael Riegelman
(74) *Attorney, Agent, or Firm* — Wood, Phillips, Katz, Clark & Mortimer

(57) ABSTRACT

The combination of: a) first and second spaced pulleys; b) an endless belt; and c) a belt installation jig having a body with: a pulley pressing part; a belt holding part; and a belt pressing part. The belt installation jig and belt cooperate so that with the belt operatively wrapped against the second pulley and partially operatively wrapped against the first pulley, turning of the first pulley causes the belt to progressively wrap around the first pulley to a fully operatively wrapped state, whereupon further turning of the first pulley situates the belt installation jig for separation from the belt and pulleys.

36 Claims, 22 Drawing Sheets

(56) References Cited

U.S. PATENT DOCUMENTS

| | | | |
|---|---|---|---|
| 2004/0248681 A1* | 12/2004 | Riaudel | 474/130 |
| 2005/0164815 A1* | 7/2005 | Winninger et al. | 474/130 |
| 2005/0170923 A1* | 8/2005 | Hodjat | 474/130 |
| 2005/0221934 A1* | 10/2005 | Shaw | 474/130 |
| 2010/0248878 A1* | 9/2010 | Maruyama et al. | 474/148 |

FOREIGN PATENT DOCUMENTS

| | | |
|---|---|---|
| JP | 2006300172 A | 11/2006 |
| JP | 2007 120678 A | 5/2007 |
| JP | 2007-120678 A | 5/2007 |
| JP | 2007120678 A | 5/2007 |
| JP | 2009 115150 A | 5/2009 |
| JP | 2009-115150 A | 5/2009 |
| WO | WO 2005/012766 A1 | 2/2005 |
| WO | WO-2005-012766 A1 | 2/2005 |
| WO | WO 2005/024272 A1 | 3/2005 |
| WO | WO-2005-024272 A1 | 3/2005 |
| WO | WO2009001574 A1 | 12/2008 |

\* cited by examiner

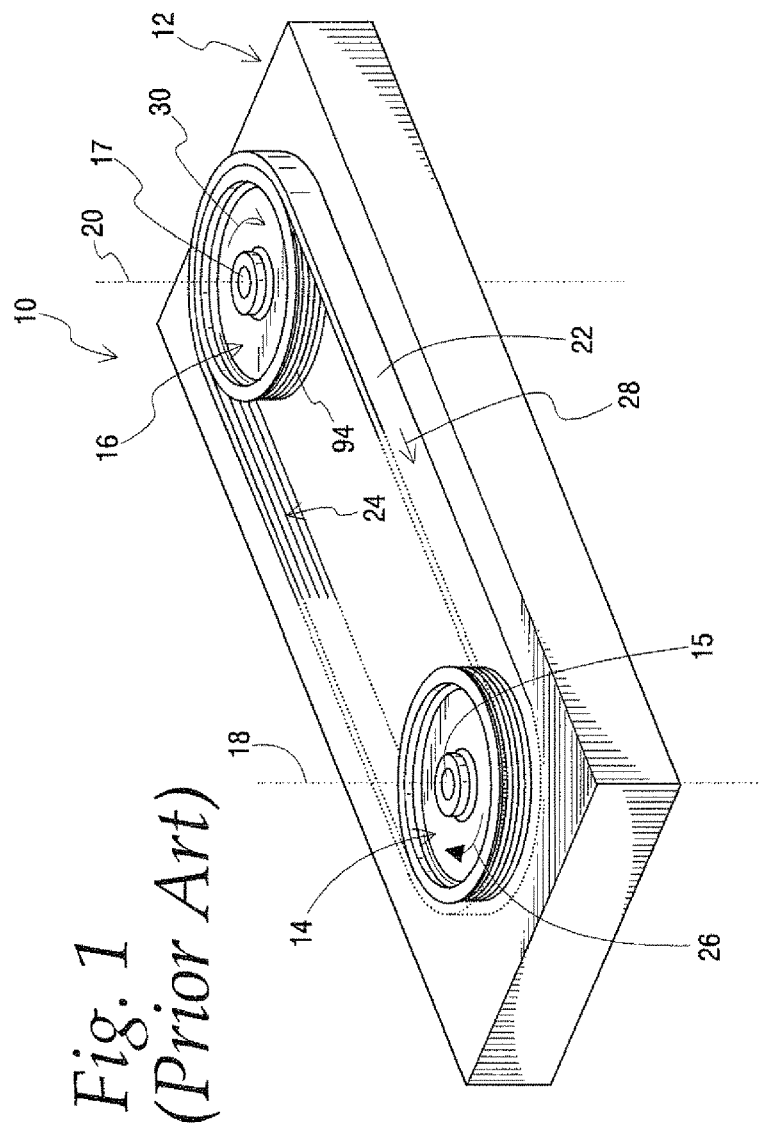

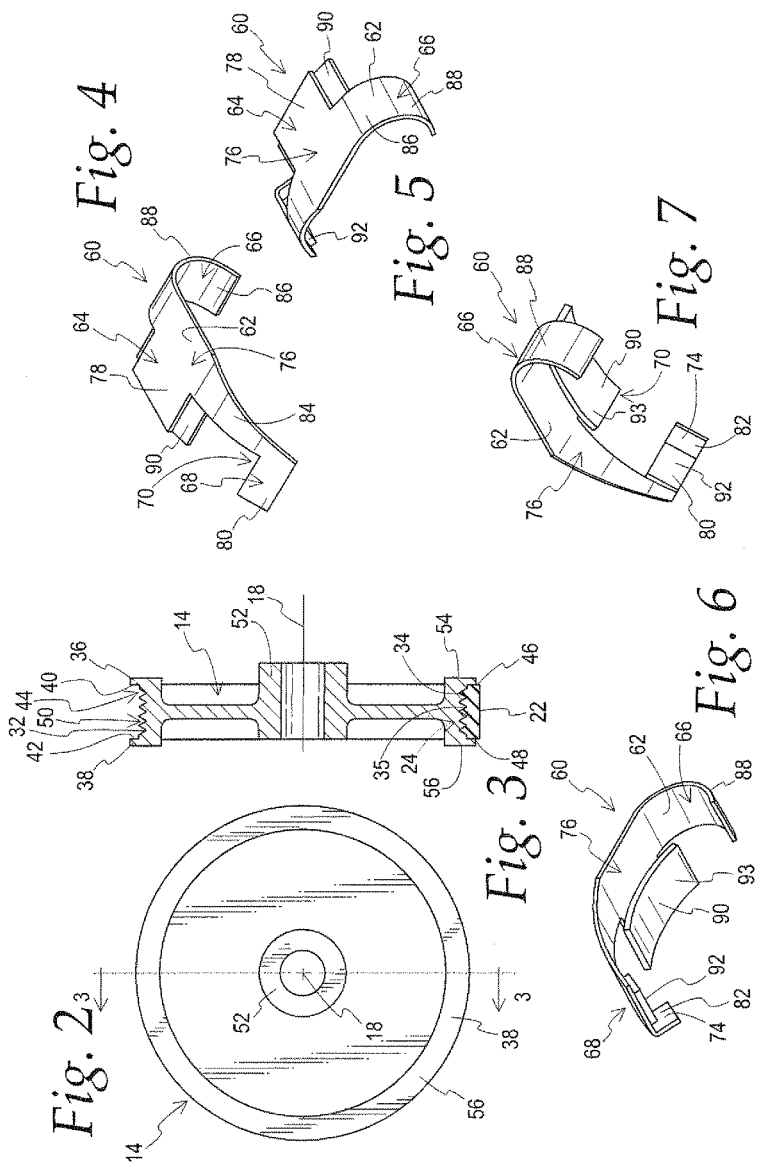

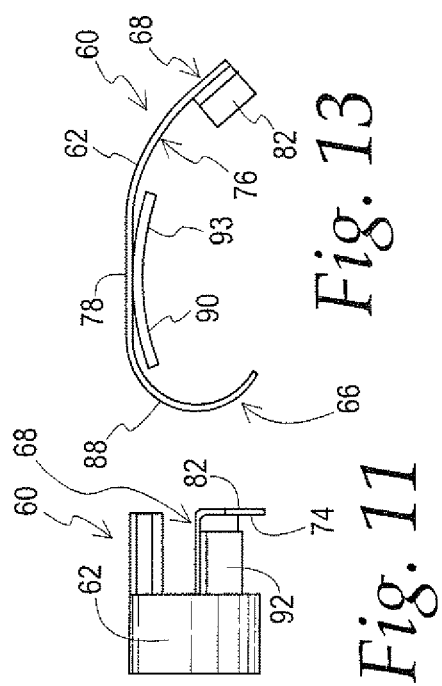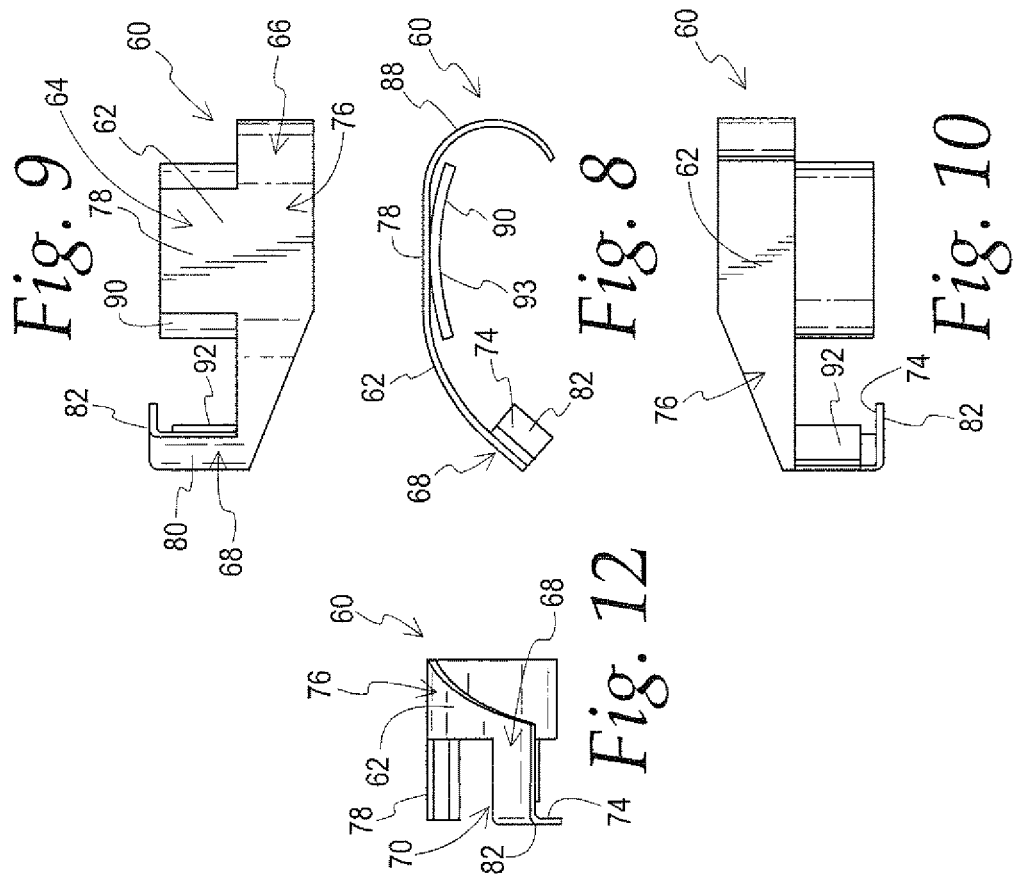

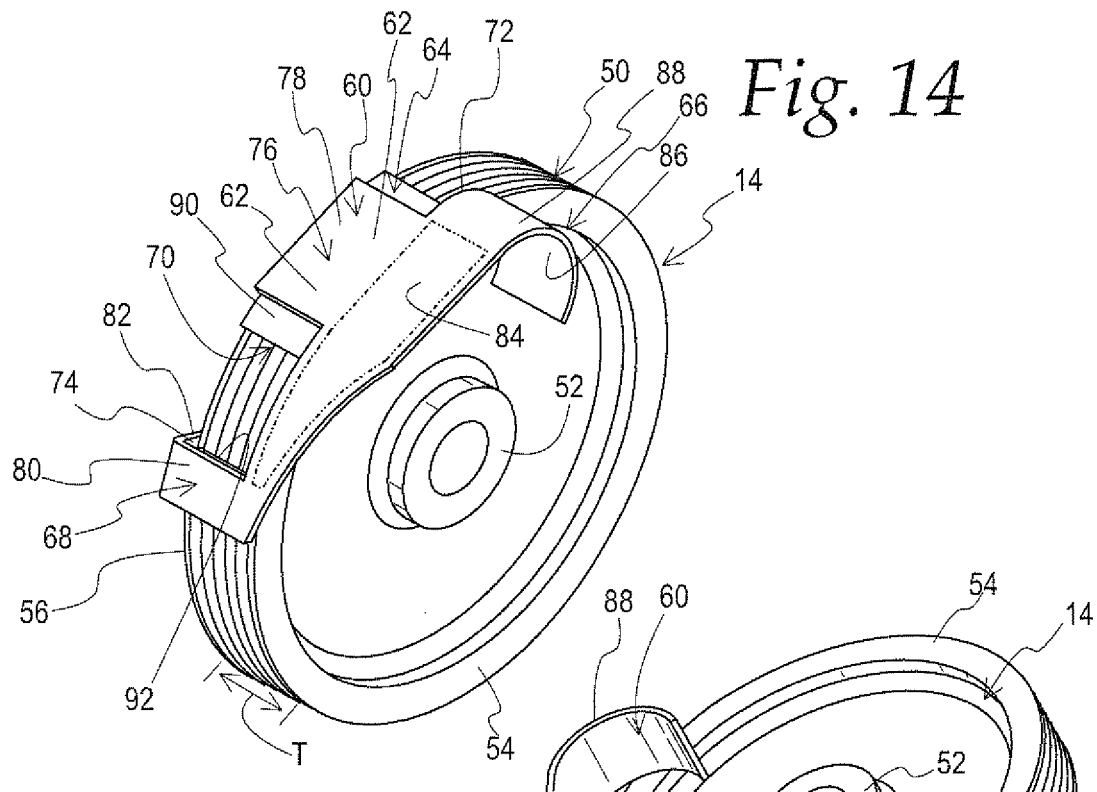
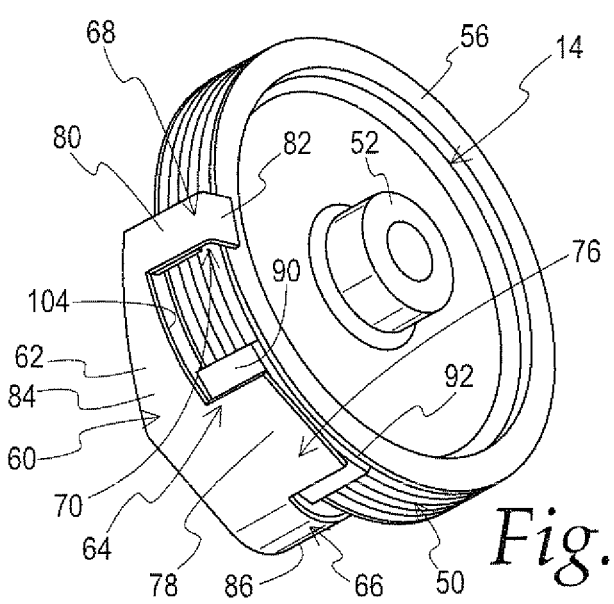

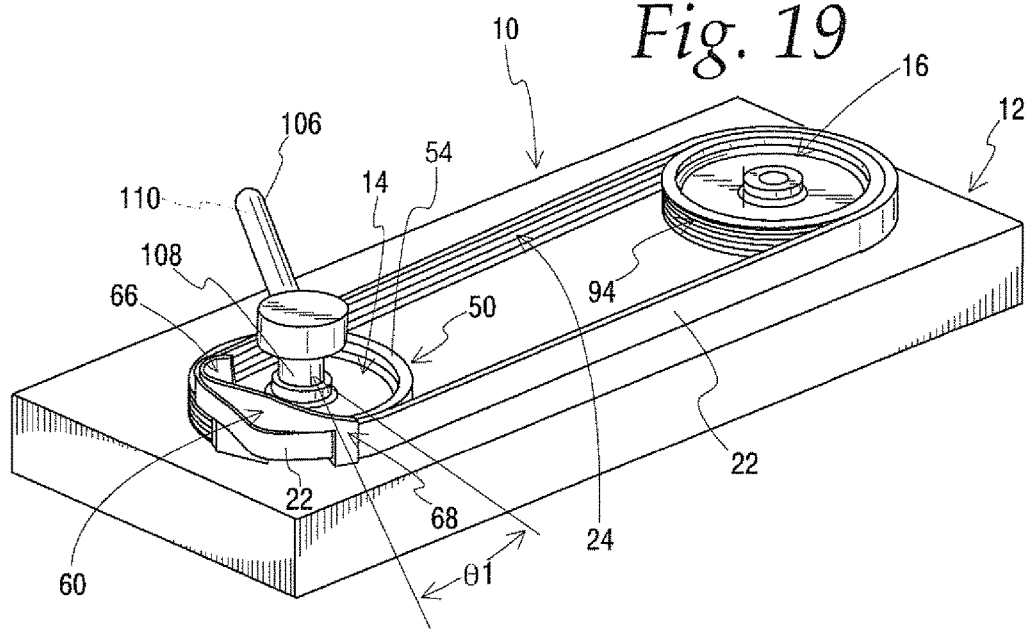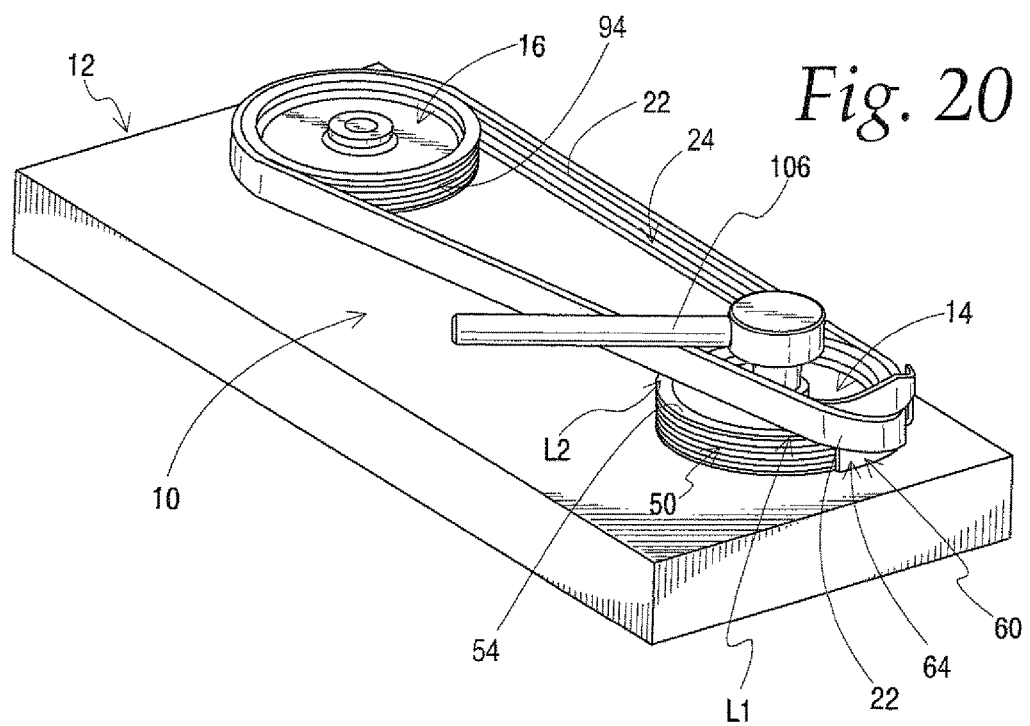

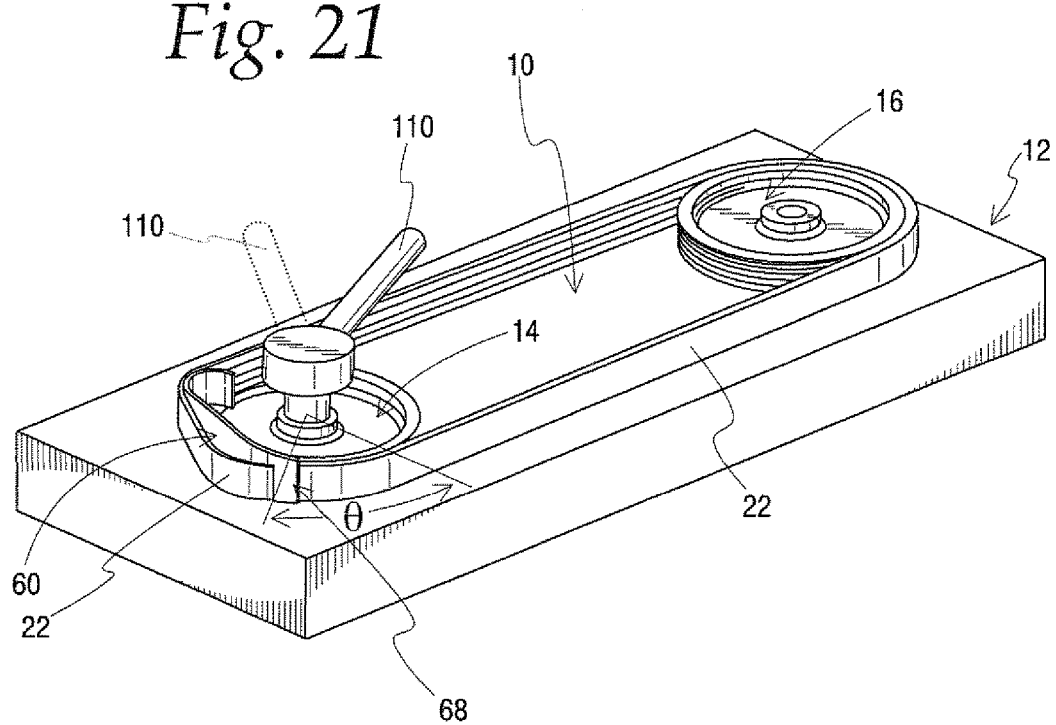
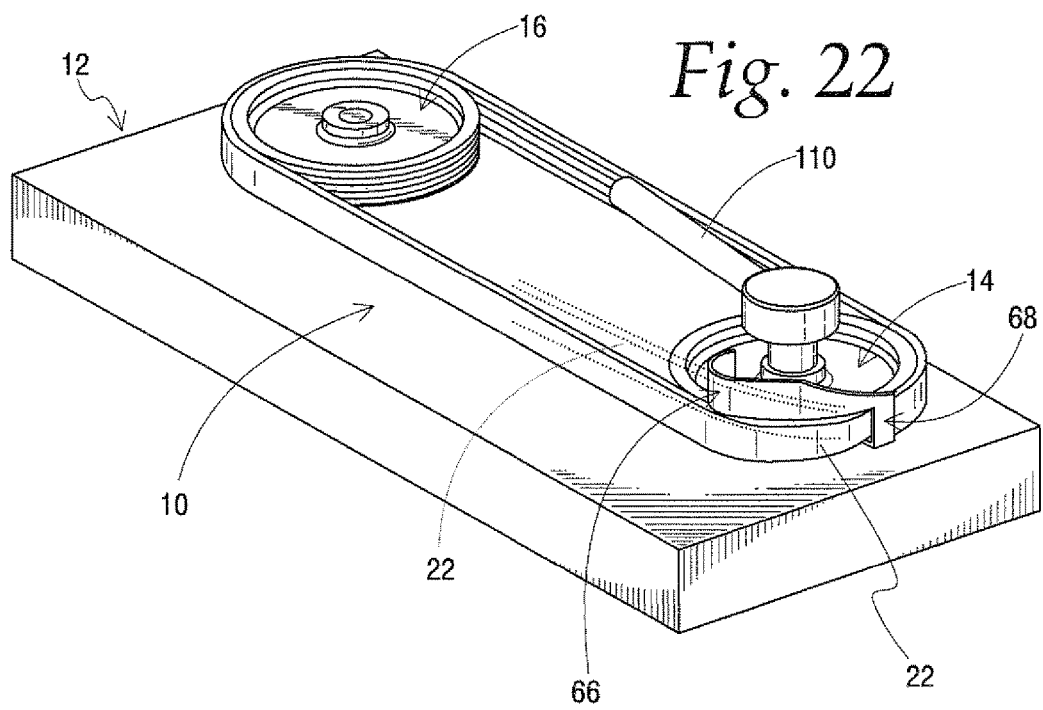

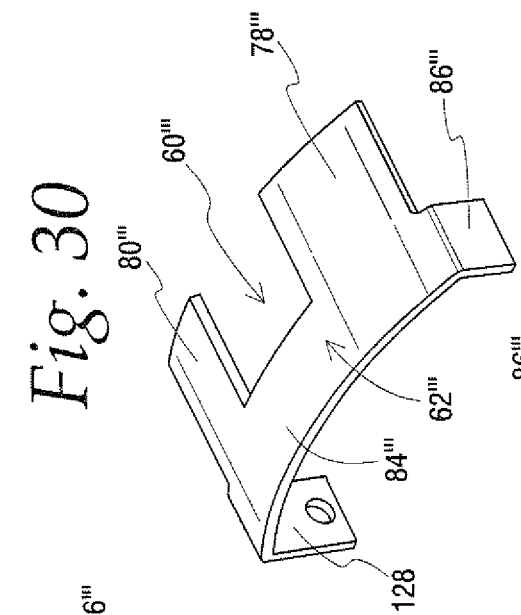
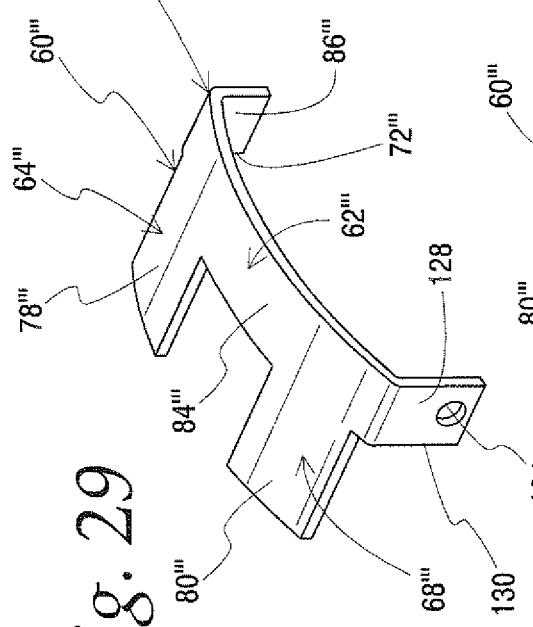
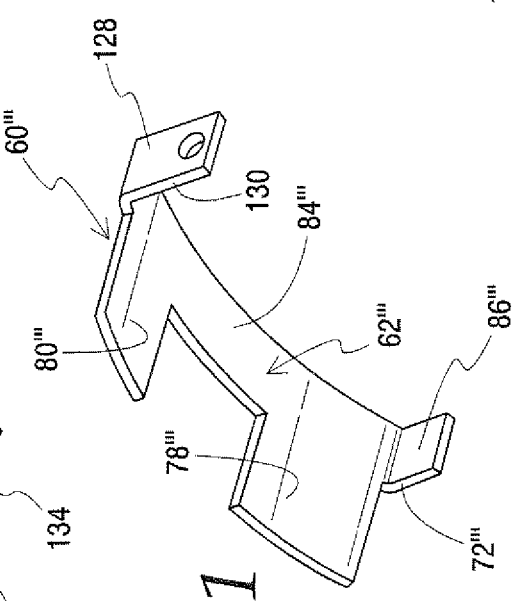
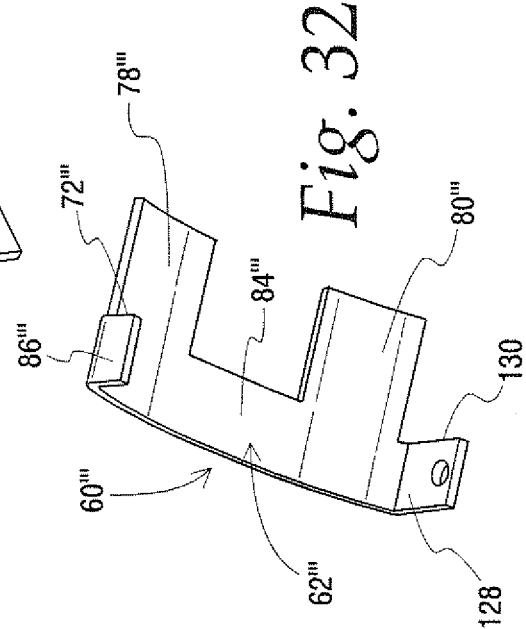

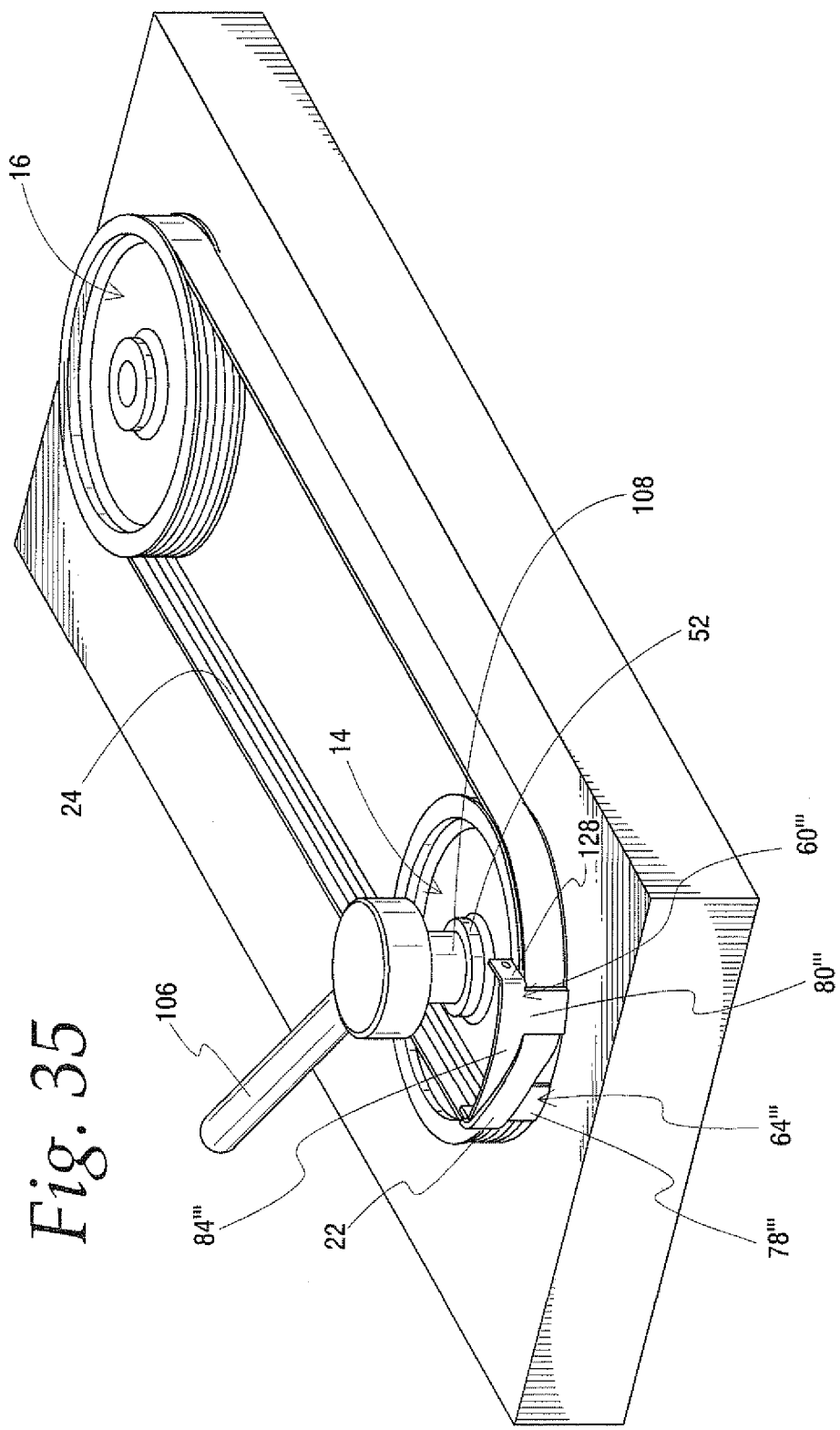

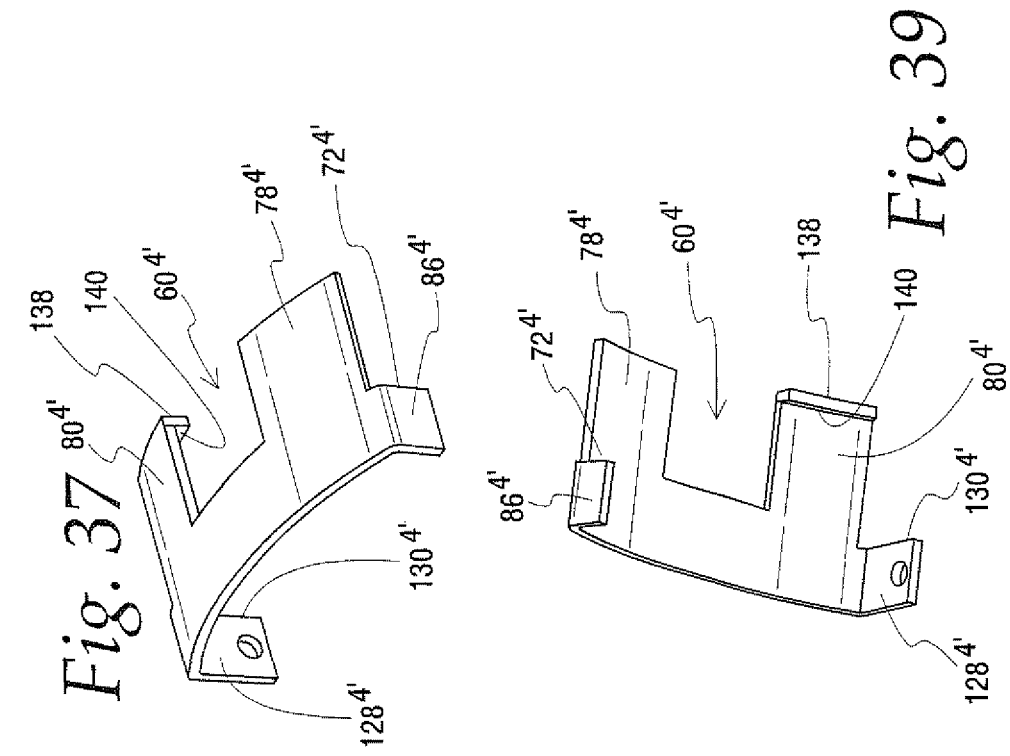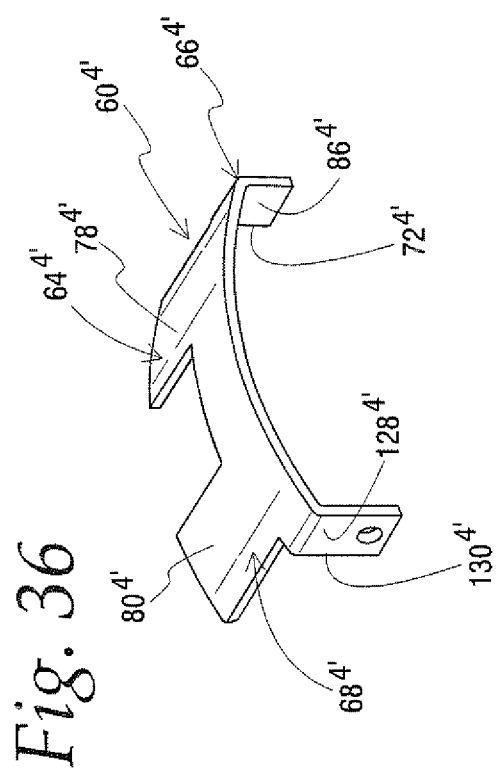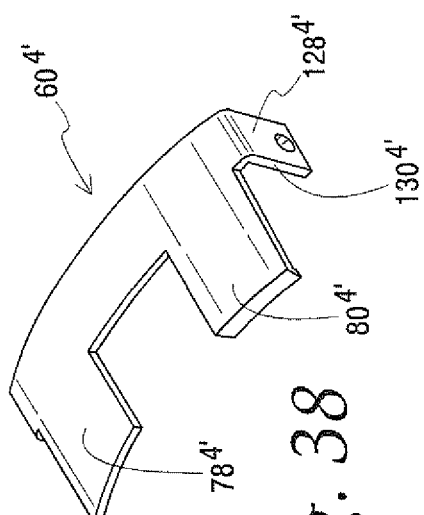

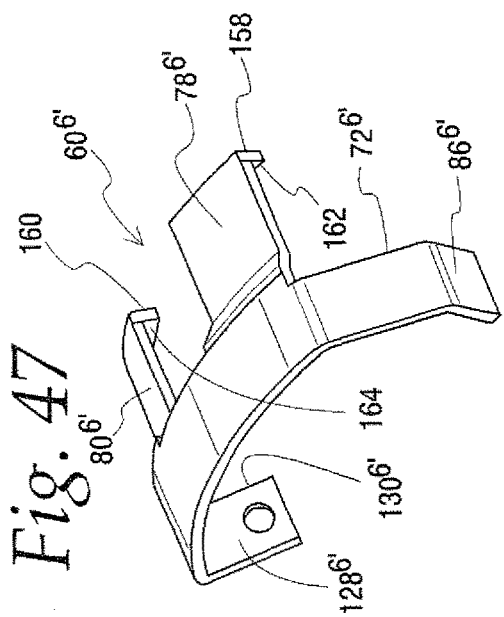
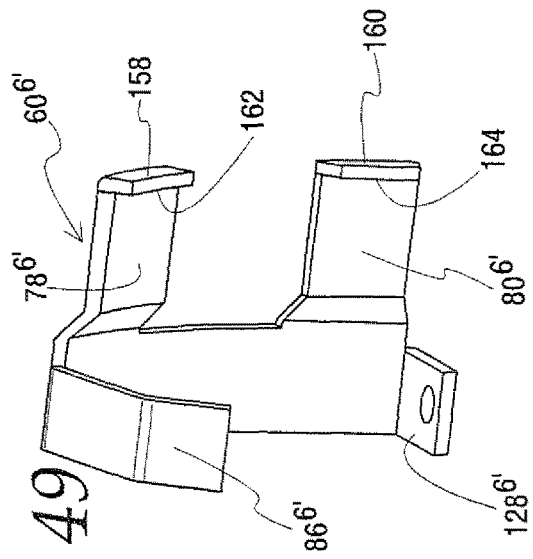
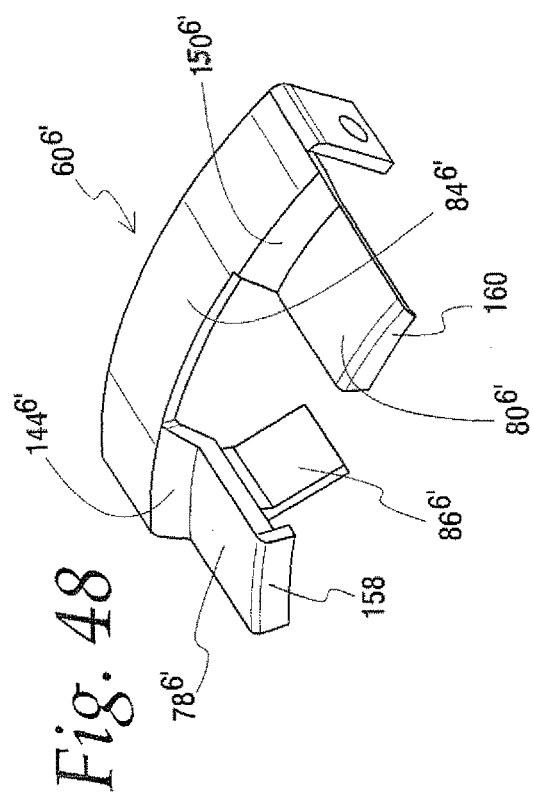

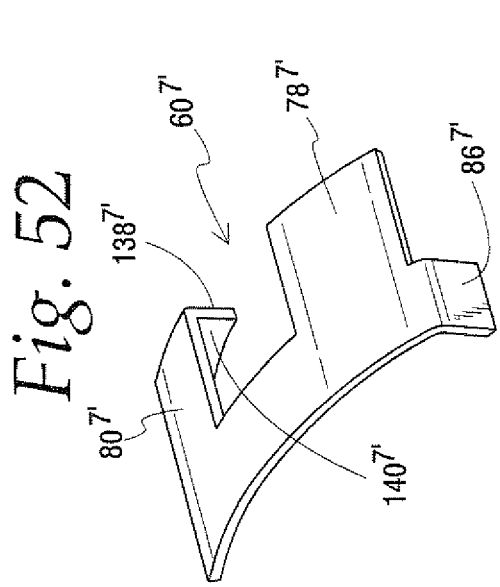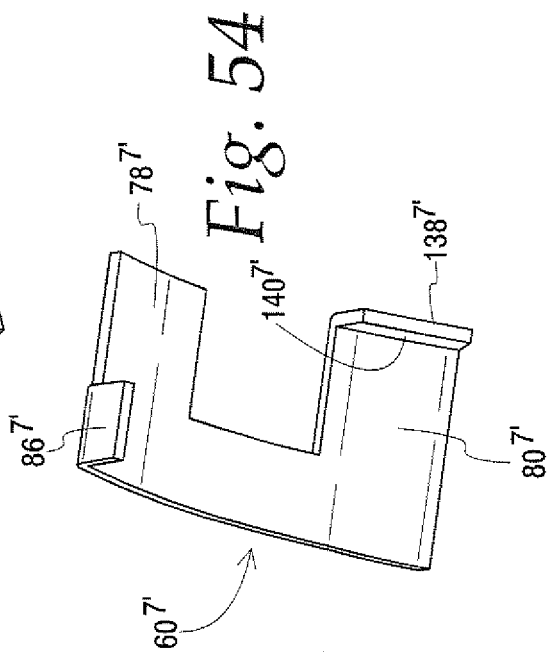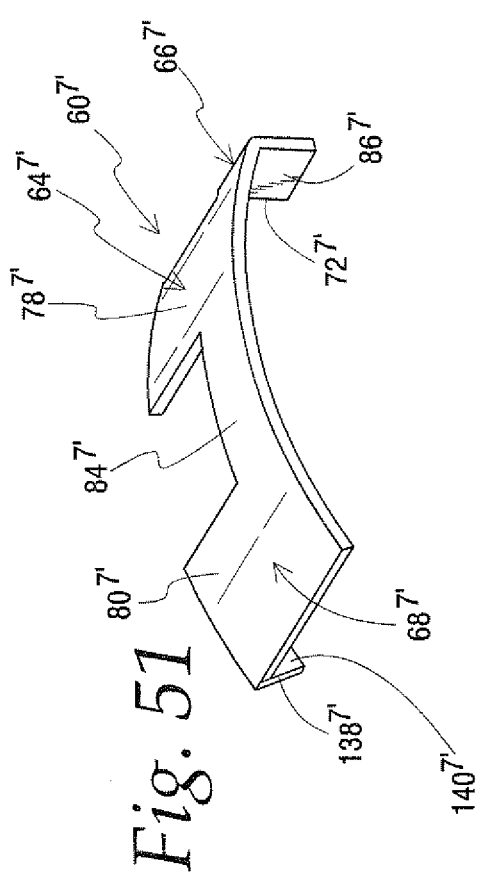

BELT INSTALLATION JIG AND A BELT INSTALLATION METHOD USING SAME

BACKGROUND OF THE INVENTION

Field of the Invention

This invention relates to power transmission belts and, more particularly, to a belt installation jig that facilitates initial training of a belt around spaced pulleys for movement in an endless path.

Background Art

Japanese Unexamined Patent Publication No. 120678/2007 (Tokukai) discloses a belt installation jig that is used to direct a belt, capable of elastically stretching in a lengthwise direction, into a groove in a back-side pulley that is paired with a front-side pulley in a two-stage pulley system. The belt installation jig has an introduction part that engages the inside of the belt at a location axially spaced from a flange on the front-side pulley. A feeding guide part directs the belt to the pulley groove of the back-side pulley, spanning across the outer circumference of the front-side pulley between the introduction part and the guide part. A pressing piece prevents lifting of the belt. An attachment unit maintains the assembly, including the above components, on the two-stage pulley structure.

Belt installation jigs of the type shown in Tokukai are well known in the art. It is important in using these installation jigs that the installation jigs be stably maintained in a desired attitude during belt installation. Tokukai achieves this stability by coupling the introduction part, the feeding engagement part, and pressing piece to the two-stage pulley through the attachment unit. The integration of the operating components through the attachment unit is essential to Tokukai's operation.

One drawback with Tokukai's design is that the presence of the attachment unit increases the size of the overall belt installation jig. Given the space limitations in typical environments where the belts are used, those designing belt installation jigs strive to maintain the overall structure as compact as possible.

Further, the system is complicated by reason of having to connect the belt installation jig and two-stage pulley together in a manner that the belt installation jig will be maintained stably in a desired orientation during belt installation.

SUMMARY OF THE INVENTION

In one form, the invention is directed to a combination including first and second pulleys that are respectively mounted to turn around spaced first and second axes, with each of the first and second pulleys having an outer circumference. The combination further includes an endless belt having a length, an inside surface and an outside surface, and a belt installation jig. The belt installation jig has a body with a pulley pressing part, a belt holding part, and a belt pressing part. The belt installation jig and belt are placed in an initial operating state in which: i) the inside surface of the belt is wrapped operatively against the outer circumference of the second pulley and partially operatively against the outer circumference of the first pulley; ii) the pulley pressing part is urged against the outer circumference of the first pulley by the belt at a first circumferential location; iii) the belt resides between the belt pressing part and the outer circumference of the first pulley; and iv) the belt is wrapped against the belt holding part at a second circumferential location, spaced in a first circumferential direction from the first circumferential location, so that the inside surface of the belt is spaced axially away from the outer circumference of the first pulley. Turning of the first pulley around the first axis in the first circumferential direction causes the belt installation jig to move: i) around the first axis so as to guide the inside surface of the belt fully operatively against the outer circumference of the first pulley; and ii) to a release location between the first and second pulley axes wherein the belt installation jig can be separated from the belt and the first and second pulleys.

In one form, the body has a main part and a discrete pad attached to the main part at the pulley pressing part that directly engages the outer circumference of the first pulley with the belt installation jig and belt in the initial operating state.

In one form, the main body is made at least partially from a first material and the discrete pad is at least one of: a) made from a second material that is capable of generating a greater frictional force upon the outer circumference of the first pulley than the first material; and b) treated to generate a greater frictional force upon the outer circumference of the first pulley.

In one form, the first pulley has a groove between axially facing first and second flange surfaces and the pulley pressing part resides between the facing first and second flange surfaces with the belt installation jig and belt in the initial operating state.

In one form, the inside surface of the belt has a plurality of ribs and recesses extending along the length of the belt. The outer circumference of the first pulley has a shape that is complementary to the ribs and recesses between the facing first and second flange surfaces. The pulley pressing part has a shape that is complementary to the shape of the outer circumference of the first pulley between the facing first and second flange surfaces.

In one form, the outer circumference of the first pulley is convexly curved and the pulley pressing part has a surface that directly engages the outer circumference of the first pulley and is curved to be complementary to the convexly curved outer circumference of the first pulley.

In one form, the first pulley has axially oppositely facing first and second surfaces and the body includes first and second facing surfaces that are abuttable respectively to the first and second pulley surfaces to limit relative movement of the body in axially opposite direction relative to the first pulley, with the belt and belt installation jig in the initial operating state.

In one form, the body comprises a third surface that is spaced circumferentially from the first surface on the body and is abuttable to the first axially facing pulley surface.

In one form, the first and second body surfaces are spaced circumferentially from each other.

In one form, the body has a fourth surface that is spaced circumferentially from the second surface on the body and is abuttable to the second axially facing pulley surface.

In one form, the first pulley has axially oppositely facing surfaces and the body has at least one surface that is abuttable to one of the axially oppositely facing surfaces on the first pulley to limit movement of the belt installation jig in one axial direction relative to the first pulley with the belt and belt installation jig in the initial operating state. With the belt and belt installation jig in the initial operating state, the belt installation jig can be moved axially oppositely to the one direction without being blocked by the first pulley.

In one form, the first pulley has a circumferential groove for receiving the belt and the belt installation jig comprises a wall that is radially offset to reside within the circumferential groove with the belt and belt installation jig in the initial operating state.

In one form, the body has a single piece that defines the entirety of the belt installation jig.

In one form, the first surface on the body is defined at the belt pressing part and the second surface on the body is defined at the belt holding part.

In one form, the belt holding part defines a convexly curved surface against which the inside surface of the belt abuts with the belt installation jig and belt in the initial operating state.

In one form, the body includes a main part and a discrete pad attached to the main part at the belt pressing part that directly engages the belt.

In one form, the body includes a main part and a discrete pad attached to the main part at the pulley pressing part that directly engages the outer circumference of the first pulley and resides between the facing first and second flange surfaces with the belt installation jig and belt in the initial operating state.

In one form, the pulley pressing part resides circumferentially between the belt holding part and belt pressing part.

In one form, there is a circumferential gap between the belt pressing part and the pulley pressing part through which the belt projects with the belt installation jig and belt in the initial operating state.

In one form, the body includes a main part that is bent against itself to define an abutting part that directly engages the outer circumference of the first pulley and resides between the facing first and second flange surfaces with the belt installation jig in the initial operating state.

The invention is further directed to a method of placing an endless belt with a length operatively around first and second pulleys that are respectively mounted to turn around first and second axes and each have an outer circumference. The method includes the steps of: a) providing a belt installation jig; b) placing the belt and belt installation jig in an initial operating state wherein the belt and belt installation jig cooperate so that an inside surface of the belt is operatively against the outer circumference of the second pulley and partially operatively against the outer circumference of the first pulley such that: i) the inside surface of the belt is against the outer circumference of the first pulley at a first circumferential location; and ii) the inside surface of the belt is supported by the belt installation jig to be axially spaced from the outer circumference of the first pulley, at a second circumferential location; c) with the belt and belt installation jig in the initial operating state, turning the first pulley in a first circumferential direction around the first axis and thereby causing the first pulley, belt, and belt installation jig to interact so that the belt is directed operatively against the outer circumference of the first pulley; d) turning the first pulley in the first circumferential direction so that the belt installation jig resides between the first and second axes; and e) repositioning the belt installation jig to separate the belt installation jig from the belt and the pulleys.

In one form, the step of placing the belt and belt installation jig in the initial operating state involves causing the belt to urge a part of the belt installation jig against the outer circumference of the first pulley.

In one form, the step of providing a belt installation jig involves providing a belt installation jig with first and second surfaces that are abuttable one each to axially oppositely facing surfaces on the first pulley to limit relative movement of the body in axially opposite directions relative to the first pulley with the belt and belt installation jig in the initial operating state.

In one form, the step of providing a belt installation jig involves providing a belt installation jig with a third surface that is spaced circumferentially from the first surface and is abuttable to the axially facing surface on the first pulley to which the first surface is abuttable.

In one form, the step of providing a belt installation jig involves providing a belt installation jig wherein the first and second surfaces are spaced circumferentially from each other.

In one form, the step of providing a belt installation jig involves providing a belt installation jig with a fourth surface that is spaced circumferentially from the second surface and is abuttable to the axially facing surface on the first pulley to which the second surface is abuttable.

In one form, the step of providing a belt installation jig involves providing a belt installation jig with at least one surface that is abuttable to one of two axially oppositely facing surfaces on the first pulley to limit movement of the belt installation jig in one direction relative to the first pulley with the belt and belt installation jig in the initial operating state. With the belt and belt installation jig in the initial operating state, the belt installation jig can be moved axially oppositely to the one direction without being blocked by the first pulley.

In one form, the first pulley has a circumferential groove for receiving the belt and the step of providing a belt installation jig involves providing a belt installation jig with a wall that is radially offset to reside within the circumferential groove with the belt and belt installation jig in the initial operating state.

In one form, the step of providing a belt installation jig involves providing a belt installation jig with a single piece body that defines the entirety of the belt installation jig.

In one form, the step of placing the belt and belt installation jig in the initial operating state involves directing the belt through a gap between circumferentially spaced parts of the belt installation jig that are at the outer circumference of the first pulley.

In one form, the first pulley has a groove between axially facing first and second flange surfaces and the step of placing the belt and belt installation jig in the initial operating state involves directing a part of the belt installation jig into the groove in the first pulley.

In one form, the belt has a plurality of ribs and recesses extending along the length of the belt, and the outer circumference of the first pulley with the groove has a shape that is complementary to the ribs and recesses between the first and second flange surfaces. The step of placing the belt and belt installation jig in the initial operating state involves directing a part of the belt installation jig with a shape complementary to the outer circumference of the first pulley between the first and second flange surfaces to within the groove.

The invention is still further directed to a belt installation jig for placing an endless belt with a length around first and second pulleys, each with an outer circumference, that are respectively mounted to turn around first and second spaced axes. The belt installation jig is placeable in operative relationship with the belt and pulleys and in the operative relationship has a body with: (a) a pulley pressing part urged against the outer circumference of the first pulley by the belt; (b) a belt holding part against which the belt is wrapped so that the belt is spaced axially away from the outer circumference of the first pulley; and (c) a belt pressing part that presses a portion of the belt against the outer circumference of the first pulley.

In one form, the belt installation jig is configured to be maintained in operative relationship with the pulleys and belt only by captive interaction between the belt installation jig, the belt, and the pulleys.

In one form, the body has a main part and a discrete pad attached to the main part at the pulley pressing part that directly engages the outer circumference of the first pulley with the belt installation jig in operative relationship with a belt and pulleys.

In one form, the main body is made at least partially from a first material and the discrete pad is at least one of: a) made from a second material that is capable of generating a greater frictional force upon the outer circumference of the first pulley than the first material; and b) treated to generate a greater frictional force upon the outer circumference of the first pulley with the belt installation jig in operative relationship with the belt and pulleys.

In one form, the first pulley has a groove between axially facing first and second flange surfaces and the pulley pressing part resides between the facing first and second flange surfaces with the belt installation jig in operative relationship with the belt and pulleys.

In one form, the belt has an inside surface with a plurality of ribs and recesses extending along the length of the belt. The outer circumference of the first pulley has a shape that is complementary to the ribs and recesses between the facing first and second flange surfaces. The pulley pressing part has a shape that is complementary to the shape of the outer circumference of the first pulley between the facing first and second flange surfaces.

In one form, the pulley pressing part has a surface that directly engages the outer circumference of the first pulley and is curved to be complementary to the outer circumference of the first pulley with the belt installation jig in operative relationship with the belt and pulleys.

In one form, the first pulley has axially oppositely facing surfaces and the body has first and second facing surfaces that are abuttable respectively to the first and second pulley surfaces to limit relative movement of the body in axially opposite direction relative to the first pulley with the belt installation jig in operative relationship with the belt and pulleys.

In one form, the first surface on the body is defined at the belt pressing part and the second surface on the body is defined at the belt holding part.

In one form, the belt holding part defines a convexly curved surface against which an inside surface of the belt abuts with the belt installation jig in operative relationship with the belt and pulleys.

In one form, the body includes a main part and a discrete pad attached to the main part at the belt pressing part that directly engages the belt with the belt installation jig in operative relationship with the belt and pulleys.

In one form, the body includes a main part and a discrete pad attached to the main part at the pulley pressing part that directly engages the outer circumference of the first pulley and resides between the facing first and second flange surfaces with the belt installation jig in operative relationship with the belt and pulleys.

In one form, the pulley pressing part resides circumferentially between the belt holding part and belt pressing part.

In one form, there is a circumferential gap between the belt pressing part and the pulley pressing part through which the belt projects with the belt installation jig in operative relationship with the belt and pulleys.

In one form, the body includes a main part that is bent against itself to define an abutting part that directly engages the outer circumference of the first pulley with a belt installation jig in operative relationship with the belt and pulleys.

BRIEF DESCRIPTION OF THE DRAWINGS

FIG. 1 is a partially schematic, perspective view of a conventional engine system including spaced pulleys around which a belt is trained;

FIG. 2 is an enlarged, plan view of a first pulley on the system in FIG. 1;

FIG. 3 is a cross-sectional view of the pulley taken along line 3-3 of FIG. 2;

FIGS. 4-13 are different perspective views of a belt installation jig, according to the present invention, for facilitating placement of a belt operatively around pulleys, as in the system in FIG. 1;

FIG. 14 is a perspective view of the inventive belt installation jig in FIGS. 4-13 operatively associated with a first pulley on the system in FIG. 1;

FIG. 15 is a view of the components in the FIG. 14 relationship from a different perspective;

FIG. 16 is a view of the components in FIGS. 14 and 15 in the same relationship and from a still further different perspective;

FIG. 19 is a perspective view of the system in FIG. 1 with the belt installation jig and belt in the initial operating state and with a wrench situated to facilitate manual turning of the one pulley with which the belt installation jig is associated and with the belt wrapped partially operatively around the one pulley;

FIG. 20 is a view of the system in FIG. 19 in the same state but from a different perspective;

FIG. 21 is a view as in FIG. 19 wherein the one pulley is turned from the FIG. 19 position to wrap an additional length of the belt operatively around the one pulley;

FIG. 22 is a perspective view of the system from a different perspective than in FIG. 21 and with the one pulley turned further than shown in FIG. 21;

FIGS. 29-32 are different perspective views of another form of belt installation jig, according to the present invention;

FIG. 35 is a perspective view of the system in FIG. 1 with the belt installation jig and belt in the initial operating state and with a wrench situated to facilitate manual turning of the one pulley with which the belt installation jig is associated and with the belt wrapped partially operatively around the one pulley;

FIGS. 36-39 are different perspective views of another form of belt installation jig, according to the present invention;

FIGS. 46-49 are different perspective views of another form of belt installation jig, according to the present invention;

FIGS. 51-54 are different perspective views of yet another form of belt installation jig, according to the present invention;

DETAILED DESCRIPTION OF THE PREFERRED EMBODIMENT

Figure 17:
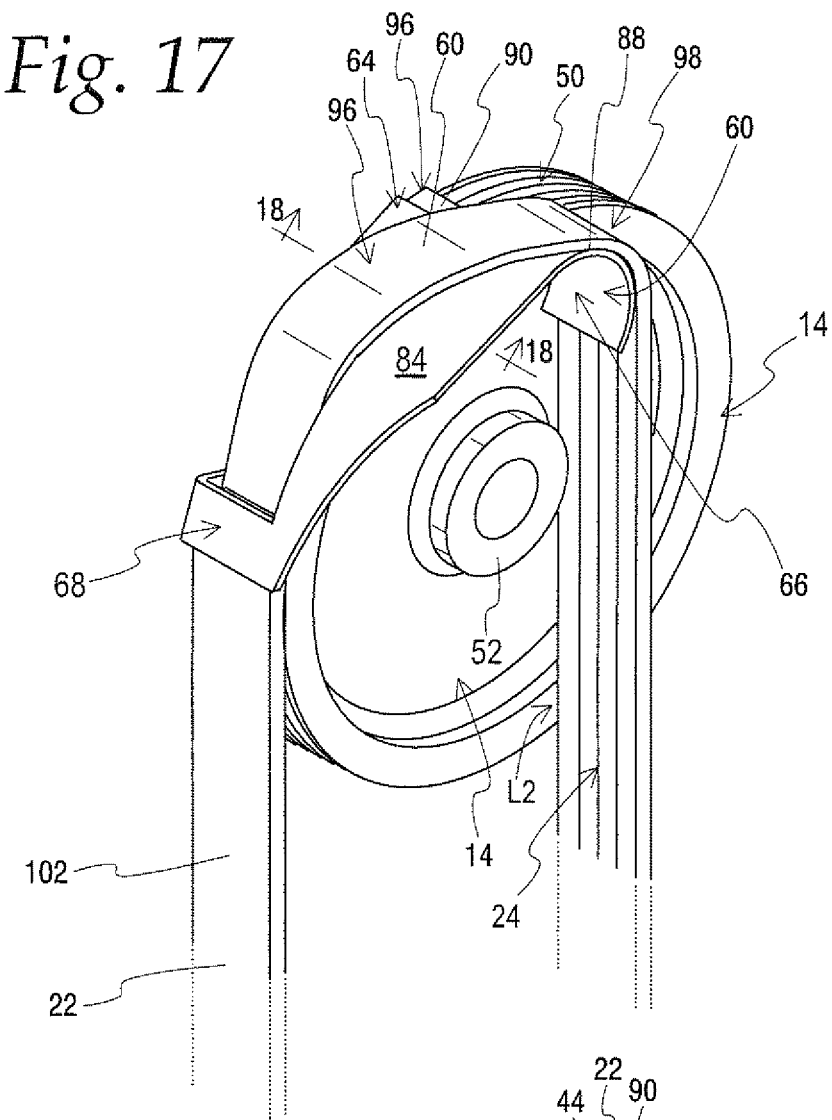
FIG. 17 is a fragmentary perspective view of the pulley in FIGS. 14-16 with the belt installation jig and belt in an initial operating state wherein the belt is partially operatively against an outer circumference of one of the pulleys.

In FIG. 1, an exemplary conventional system is shown at 10, typical of one wherein the present invention has utility. The system 10 is shown partially in schematic form and is intended to represent an engine 12 with a first/crank pulley 14, connected to a crank shaft 15 on the engine 12, and a second/alternator pulley 16, connected to an input shaft 17 of an alternator. The first and second pulleys 14, 16 are turned respectively around first and second axes 18, 20 that are at a fixed spacing and substantially parallel to each other.

In FIG. 1, an endless power transmission belt 22 is wrapped operatively around the first and second pulleys 14, 16. The belt 22 has an inside surface 24 that directly engages the pulleys 14, 16.

As the engine crank shaft 15 is operated, the first pulley 14 is driven in the direction of the arrow 26 around the axis 18. This drive force is transmitted from the pulley 14 to the belt 22 that is driven in an endless path in the direction of the arrow 28. The belt 22 in turn transmits a turning force to the pulley 16 that is caused to move about its axis 20 in the direction of the arrow 30.

As seen in FIGS. 2 and 3, the first pulley 14 has a series of axially spaced grooves 32 designed to receive complementarily-shaped ribs 34 on the inside surface 24 of the belt 22. Recesses 35 are defined between adjacent ribs 34.

Axially spaced, annular, flanges 36, 38 respectively define axially facing surfaces 40, 42 that bound a main groove 44 within which the narrower grooves 32 are formed. The flange surfaces 40, 42 bound a space within which the belt 22 can be directed. The flange surfaces 40, 42 are respectively adjacent to or abut belt side surfaces 46, 48 with the belt 22 wrapped operatively against the outer circumference 50 of the pulley 14. The pulley 14 has a hub 52 through which the crank shaft 15 projects and defines the axis 18. The flanges 36, 38 define annular, axially oppositely facing side surfaces 54, 56.

One preferred form of belt installation jig, according to the present invention, is shown at 60 in FIGS. 4-13. The belt installation jig 60 is shown operatively associated with the first/crank pulley 14 in FIGS. 14-16.

The belt installation jig 60 has a body 62 that defines a pulley pressing part 64, a belt holding part 66, and a belt pressing part 68. The pulley pressing part 64 resides circumferentially between the belt holding part 66 and the belt pressing part 68. A circumferential gap 70 is formed between the belt pressing part 68 and the pulley pressing part 64.

With the belt installation jig 60 operatively associated with the first/crank pulley 14, as seen in FIGS. 14-16, the belt pressing part 68 and pulley pressing part 64 overlie the outer circumference 50 of the pulley 14, with the belt holding part 66 axially offset from the outer circumference 50. The body 62 has axially facing surfaces 72, 74, defined respectively at the belt holding part 66 and belt pressing part 68, that limit relative axial movement between the belt installation jig 60 and pulley 14. More specifically, the thickness T of the pulley 14 between the side surfaces 54, 56 is captive between the surfaces 72, 74. The surfaces 54, 72 abut to limit movement of the belt installation jig 60 relative to the pulley 14 in one axial direction, whereas the surfaces 56, 74 abut to limit movement of the belt installation jig 60 relative to the pulley 14 in an axially opposite direction.

The body 62 has a main part 76 that may be formed from a metal sheet/plate. The main part 76 defines a generally rectangular wall 78 at the pulley pressing part 64 and a spaced rectangular wall 80 at the belt pressing part 68. The wall 80 has a bent end 82 that defines the surface 74. The main part 76 further has an interconnecting wall 84 that extends between the rectangular walls 78, 80 and has an end 86 that is bent into a hook shape at the belt holding part 66. The interconnecting wall 84 is curved to follow the contour of the outer circumference 50 of the pulley 14. The hook shape is such that a convexly curved surface 88 is defined at the end 86 with the convex curvature nominally matching the convex curvature of the outer circumference 50 of the pulley 14. The surface 88 extends through an arc of approximately 180°. The interconnecting wall 84 and the surface 88 thereon are offset from the outer circumference 50 of the pulley 14. The end 86 of the interconnecting wall 84 has an edge that defines the surface 72.

The main part 76 may be formed from a single piece/sheet of iron or steel. A discrete pad 90 is attached, as by welding, to the wall 78 at the pulley pressing part 64. The pad 90 has a curved shape that is matched to the convex curvature of the outer circumference 50 of the pulley 14. The pad 90 is preferably made from a material that is capable of generating a greater frictional force upon the outer circumference 50 of the pulley 14 than the material that makes up the main part 76 of the body 62. The pad 90 is configured to directly abut to the outer circumference 50 of the pulley 14, as explained in greater detail below.

A separate pad 92 is attached to the wall 80 at the belt pressing part 68 to directly engage the belt 22, as hereinafter described.

The pad 90 may be made from a metal material with a treated inner surface 93 that produces the desired frictional characteristics. Alternatively, the pad 90 may be made from a rubber material, an elastomer such as polyurethane, or a synthesized resin such as polyethylene or polyamide.

In FIGS. 17-20, the belt installation jig 60 and belt 22 are shown placed in an initial operating state wherein: a) the inside surface 24 of the belt 22 is wrapped operatively against the outer circumference 94 (see also FIG. 1) of the second/alternator pulley 16, and partially operatively against the outer circumference 50 of the first/crank pulley 14; b) the pulley pressing part 64 is urged against the outer circumference 50 of the pulley 14 by the belt 22 at a first circumferential location 96; c) the belt 22 resides radially between the belt pressing part 68 and the outer circumference 50 of the pulley 14; and d) the belt 22 is wrapped against the curved surface 88 on the belt holding part 66 at a second circumferential location 98, spaced in a first circumferential direction from the first circumferential location 96, and so that the inside surface 24 of the belt 22 at the second circumferential location 98 is spaced axially away from the outer circumference 50 of the pulley 14. The belt 22 projects through the gap 70 so as to reside radially inside of the belt pressing part 68 and radially overlie the pulley pressing part 64. The belt pressing part 68 urges the underlying portion of the belt 22 against the outer circumference 50 of the pulley 14.

The pad 90 has an axial dimension to substantially fill the width W of the main groove 44 between the flange surfaces 40, 42. As seen in FIG. 15, a radial gap 100, to receive the thickness of the belt 22, between the inside surface 24 and an outside surface 102 thereon, is defined between the pad 92 and the outer circumference 50 of the pulley 14. The gap 100 is selected so that with the pad 90 urged against the outer circumference 50 of the pulley 14, the radial dimension of the gap 100 is slightly less than the thickness of the belt 22 between the inside surface 24 and an outside surface 102. Resultingly, the belt pressing part 68 firmly presses the belt 22 against the outer circumference 50 of the pulley 14.

The circumferential dimension of the gap 70 is chosen so that the belt 22 can extend from the gap 100 to over the wall 78 and project angularly away therefrom to overlie the curved surface 88 on the belt holding part 66.

While the belt installation jig 60 has been described to be made with the main part 76 and separate pads 90, 92, it is contemplated that the entire belt installation jig 60 might be made as one piece. Alternatively, multiple pieces, other than the separate pads 90, 92, might be joined together to produce a configuration that will function as described above and hereinbelow.

Belt installation is initiated on the system 10 by placing the belt installation jig 60 and belt 22 in the aforementioned initial operating state, as shown in FIGS. 17-20. In this state, the relative axial positions of the belt installation jig 60 and pulley 14 are maintained by the interaction of the surfaces 54, 72 and 56, 74 as well as the interaction of the pad 90 with the pulley flange surfaces 40, 42. The gap 70 is bounded by a U-shaped edge 104 that is configured to allow the belt 22 to project through the gap 70 in alignment with the outer circumference 50 of the pulley 14 adjacent to the belt pressing part 68. A substantial pressure is applied by the edge 104 that acts as a fulcrum where the belt 22 bends axially away from the outer pulley circumference 50 to overlie the curved belt holding part 66.

In the initial operating state, the belt 22 is squeezed between the belt pressing part 68 and outer circumference 50 of the pulley 14 and is under tension so as to urge the underlying pulley pressing part 64 at the first location 96 against the outer circumference 50 of the pulley 14. The pad 90 resides within the main groove 44 so as to axially lock the belt installation jig 60 relative to the pulley 14 in conjunction with the limiting action resulting from the interaction of the surfaces 54, 72 and 56, 74. The belt 22 projects angularly across the belt installation jig 60 to engage the convex surface 88 on the belt holding part 66. From the belt holding part 66, the belt 22 spans across the annular side surface 54 and engages therewith at circumferentially spaced locations indicated at L1, L2.

As seen in FIGS. 19-25, a wrench 106 is used to turn the pulley 14 around its axis 18 with the belt installation jig 60 and belt 22 in the initial operating state. More specifically, a cylindrical connector 108 on the wrench 106 is keyed to the hub 52, whereupon a handle 110 on the wrench 106 can be manipulated to turn the pulley 14.

Preferably, the wrench 106 is situated so that the handle 110 thereon projects away from the belt installation jig 60 so as to be easily grasped and repositioned. Through the wrench 106, the pulley 14 is turned from its position shown in FIGS. 17, 19, and 20, representing the initial operating state for the belt installation jig 60 and belt 22, to the position shown in FIG. 21. To effect this movement, the wrench handle 110 is moved between the dotted line position into the solid line position in FIG. 21. As the pulley 14 moves this amount, the belt 22 is caused to wrap an additional circumferential distance around the outer circumference 50 of the pulley 14, with the wrapping angle θ in FIG. 21 increased from the wrapping angle θ1 in FIG. 19. To permit this, the belt 22 is elastically stretched in a lengthwise direction and, as a result, placed under a relatively high tension. This tension causes a substantial force component to urge the underlying pulley pressing part 64 positively against the outer circumference 50 of the pulley 14.

Continued turning of the pulley 14 through the wrench 106 to the FIG. 22 position causes the belt 22 to shift radially outwardly so that it does not radially overlap the pulley surface 54 to which it previously abutted. As the belt 22 clears the pulley surface 54, the tension in the belt 22 causes the belt 22 to slide axially from the dotted line position in FIG. 22, to the solid line position therein, wherein the belt portion shown in dotted lines shifts to align axially with the outer pulley circumference 50 and further moves radially into meshed engagement with the pulley 14.

Figure 23:
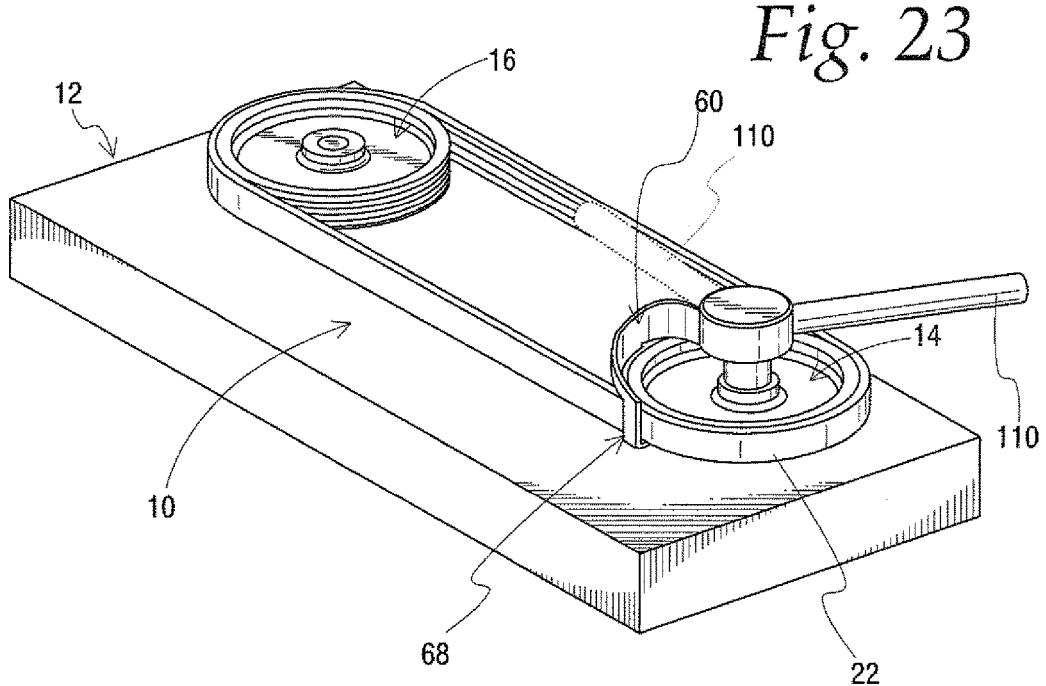
FIG. 23 is a view as in FIG. 22 wherein the one pulley is turned so that the belt is further wrapped around the one pulley.
Figure 24:
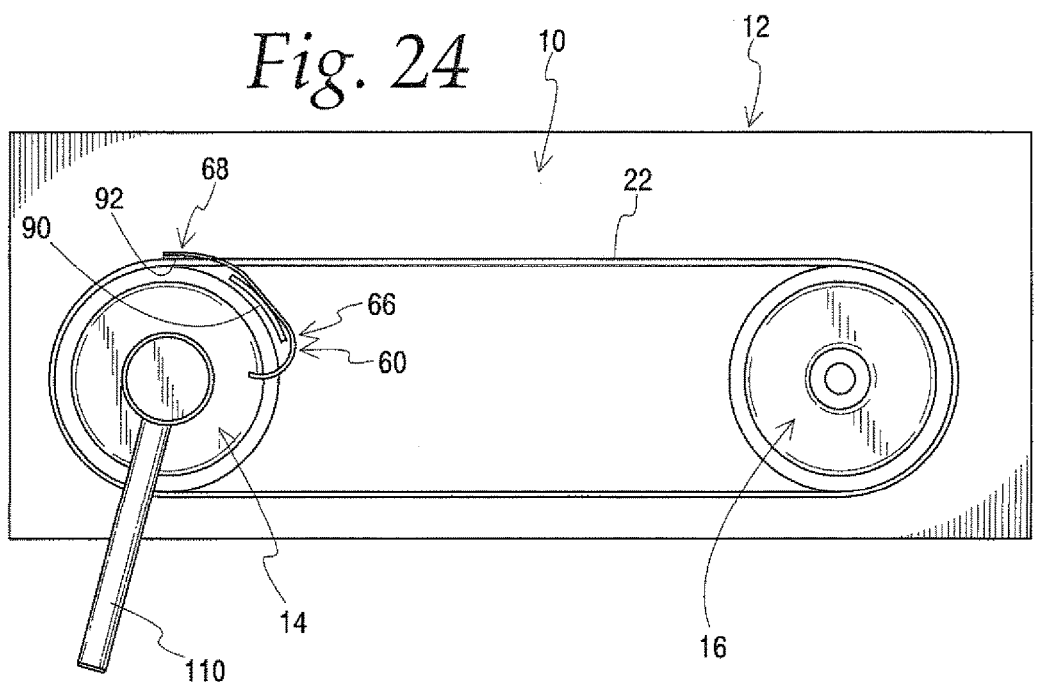
FIG. 24 is a plan view of the system in the FIG. 23 state.

Continued turning of the pulley 14 from the FIG. 22 position to that in FIGS. 23 and 24 causes the belt installation jig 60 to move so that the pulley pressing part 64 is no longer captive between the belt 22 and the outer circumference 50 of the pulley 14.

Figure 25:
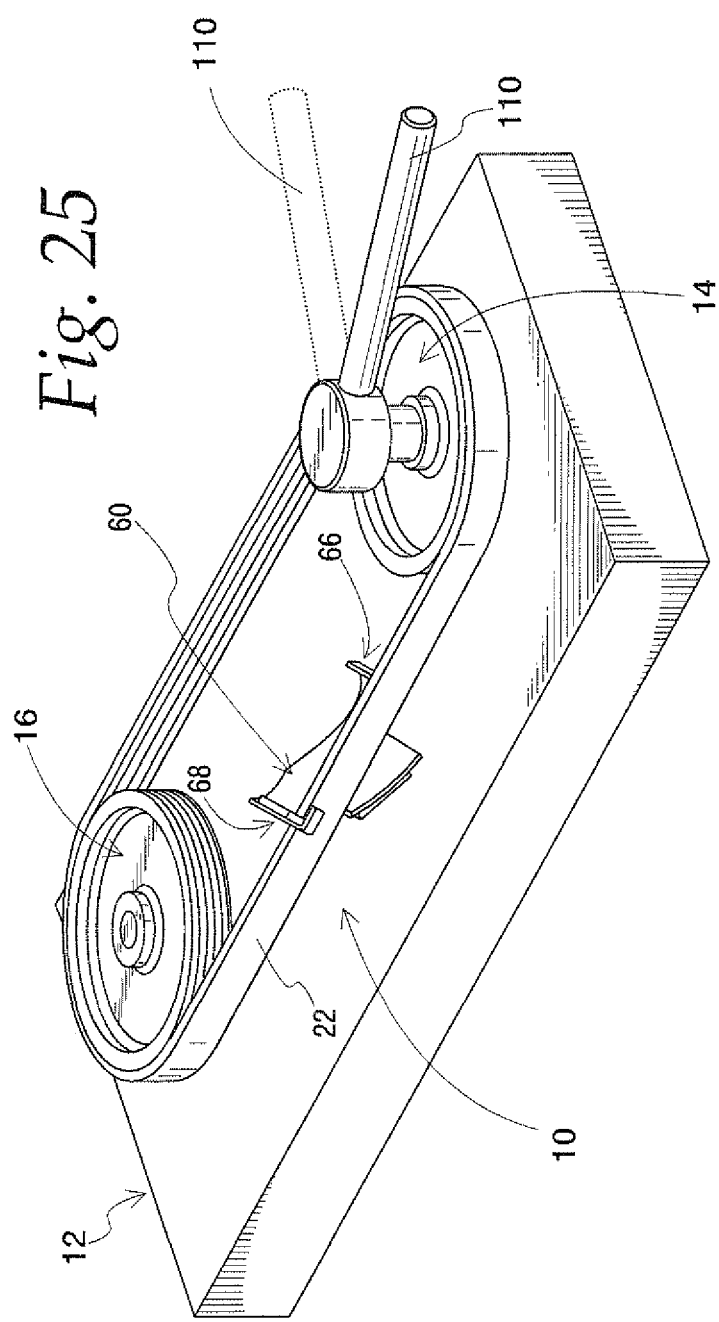
FIG. 25 is a view as in FIG. 23 wherein the one pulley has been further turned to cause the belt installation jig to be separated from the one pulley so as to be retrievable for reuse.

Still further additional turning of the pulley 14 causes the belt installation jig 60 to separate fully from the pulley 14, as shown in FIG. 25. In FIG. 25, the belt installation jig 60 is hanging from the belt 22 at an unsupported portion thereon and between the axes 18, 20 of the pulleys 14, 16. The belt installation jig 60 can then be strategically repositioned to be separated from the belt 22 and retrieved for re-use.

With the above construction, the belt installation jig 60 can be stably maintained in operative relationship with the other system components, namely the belt 22 and pulleys 14, 16, as seen in FIGS. 19-24, as it is employed, solely by a captive interaction between the belt installation jig 60, the belt 22 and the pulleys 14, 16. This obviates the need for any connecting structure between the belt installation jig 60 and any other system components. At the same time, the belt installation jig 60 can be made with a compact configuration and conveniently separated from the system once the belt 22 is installed.

Figure 18:
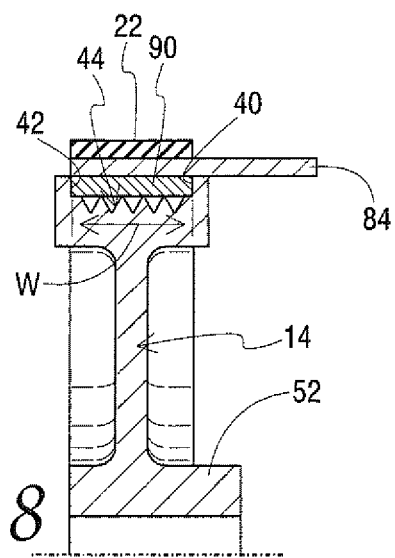
FIG. 18 is a fragmentary cross-sectional view of the belt, belt installation jig, and pulley taken along line 18-18 of FIG. 17.
Figure 26:
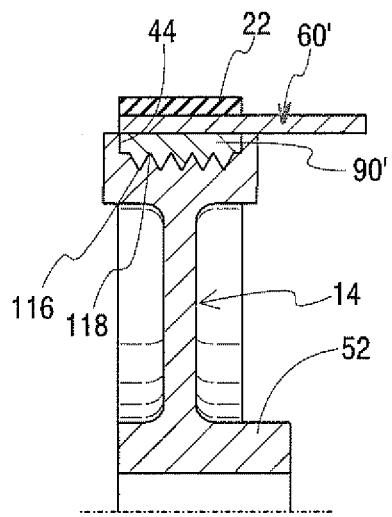
FIG. 26 is a view as in FIG. 18 and showing a modified form of belt installation jig.

The invention contemplates variations from the above structure, only some of which are described hereinbelow. As one example shown in FIG. 26, as an alternative to using the pad 90, as shown in FIG. 18, a pad 90' on a modified form of belt installation jig 60' can be employed that is different in that it has alternating ribs 116 and recesses 118 that are complementary to those on the pulley 14 within the main groove 44. The meshing of the ribs and recesses 116, 118 with complementary shapes on the pulley 14 can more effectively restrain the modified belt installation jig 60' against axial displacement relative to the pulley 14.

With the inventive concepts, a relatively inexpensive and compact belt installation jig might be made that is consistently stably supportable in a desired attitude as it is used to facilitate belt installation. This stability is afforded by the interaction of different parts of the belt installation jig with the belt and pulleys around which the belt is trained. At the same time, the belt installation jig can be fully separated from the system after use. The belt installation jig may be used without any attaching structure beyond the belt and pulley components around which the belt is trained.

Figure 27:
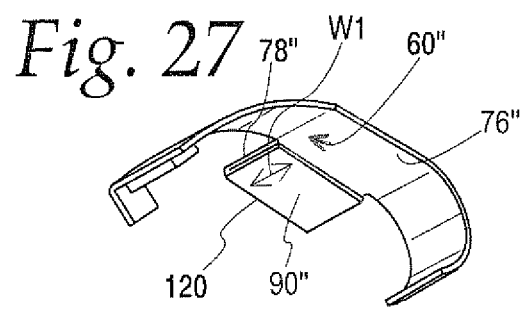
FIG. 27 is a perspective view of a further modified form of belt installation jig, according to the present invention.
Figure 28:
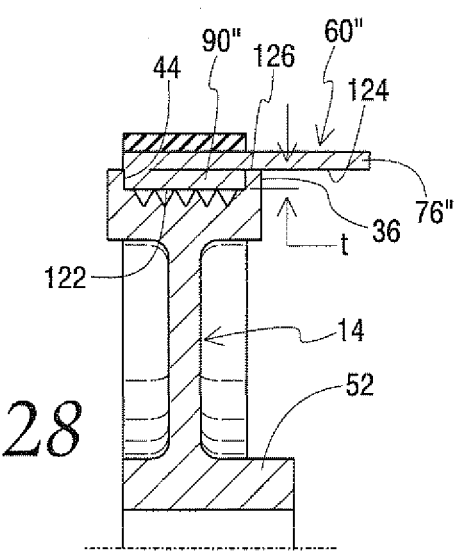
FIG. 28 is a view corresponding to that in FIGS. 18 and 26 with the belt installation jig of FIG. 27 operatively associated with the pulley.

In FIGS. 27 and 28, another modified form of belt installation jig 60" is shown. The primary modification is the integral formation of a pad 90" with a main part 76" of the belt installation jig 60". More specifically, the rectangular wall 78" is made wider by the width W1 of the pad 90", and is folded at an edge 120 so that the wall 78" and pad 90" facially abut each other. The width W1 is selected so that the pad 90" defines an abutting part that resides tightly within the main groove 44 of the pulley 14 to control axial shifting of the pad 90", and thus the belt installation jig 60", relative to the pulley 40. The pad 90" has a thickness t selected so that with the surface 122 of the pad 90" bridging the pulley ribs, the radially inwardly facing surface 124 on the main part 76" abuts to a perimeter edge 126 of the pulley flange 36.

By reason of making the pad 90" and wall 78" in one piece, potentially manufacturing costs can be reduced compared to a two-piece construction.

Other variations are contemplated. For example, the pads 90, 92 in the previously described embodiment might be omitted.

It is also contemplated that all of the features of the different embodiments may be combined. For example, it was mentioned that the pulley engaging surface of the pad 90 might be surface treated to achieve desired frictional characteristics. The pad 90' may likewise be surface treated to alter its frictional characteristics.

The pad 90 may also be provided with one or more projections that move into grooves on the pulley 14.

In a FIGS. 29-34, a further modified form of belt installation jig is shown at 60". The belt installation jig 60" has the same basic operating parts as the earlier described embodiments. That is, the belt installation jig 60" has a pulley pressing part 64" a belt holding part 66", and a belt pressing part 68". All of these parts 64", 66", 68" are defined by a one-piece body 62".

Figure 33:
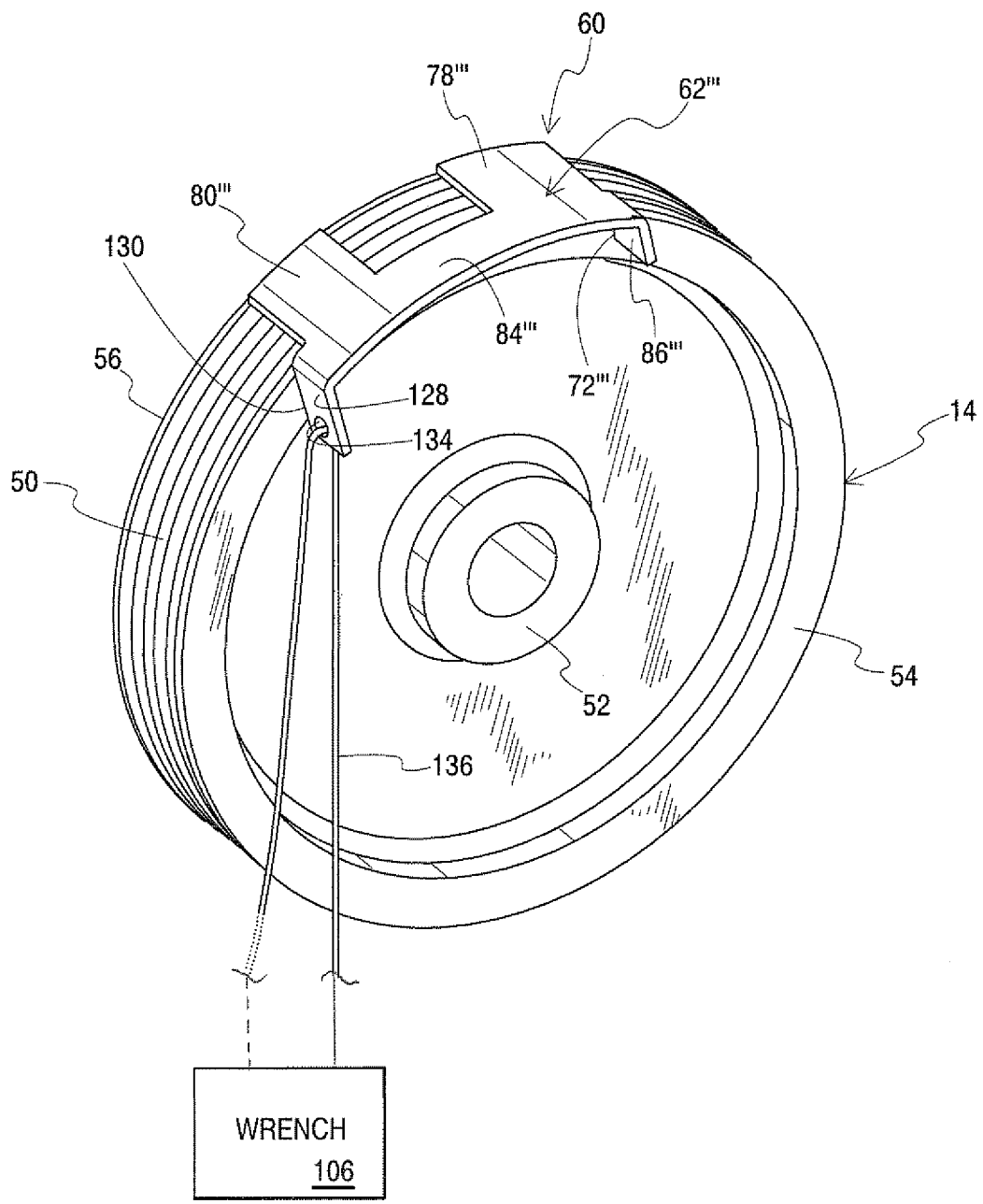
FIG. 33 is a perspective view of the belt installation jig in FIGS. 29-32 operatively associated with a first pulley on the system in FIG. 1.
Figure 34:
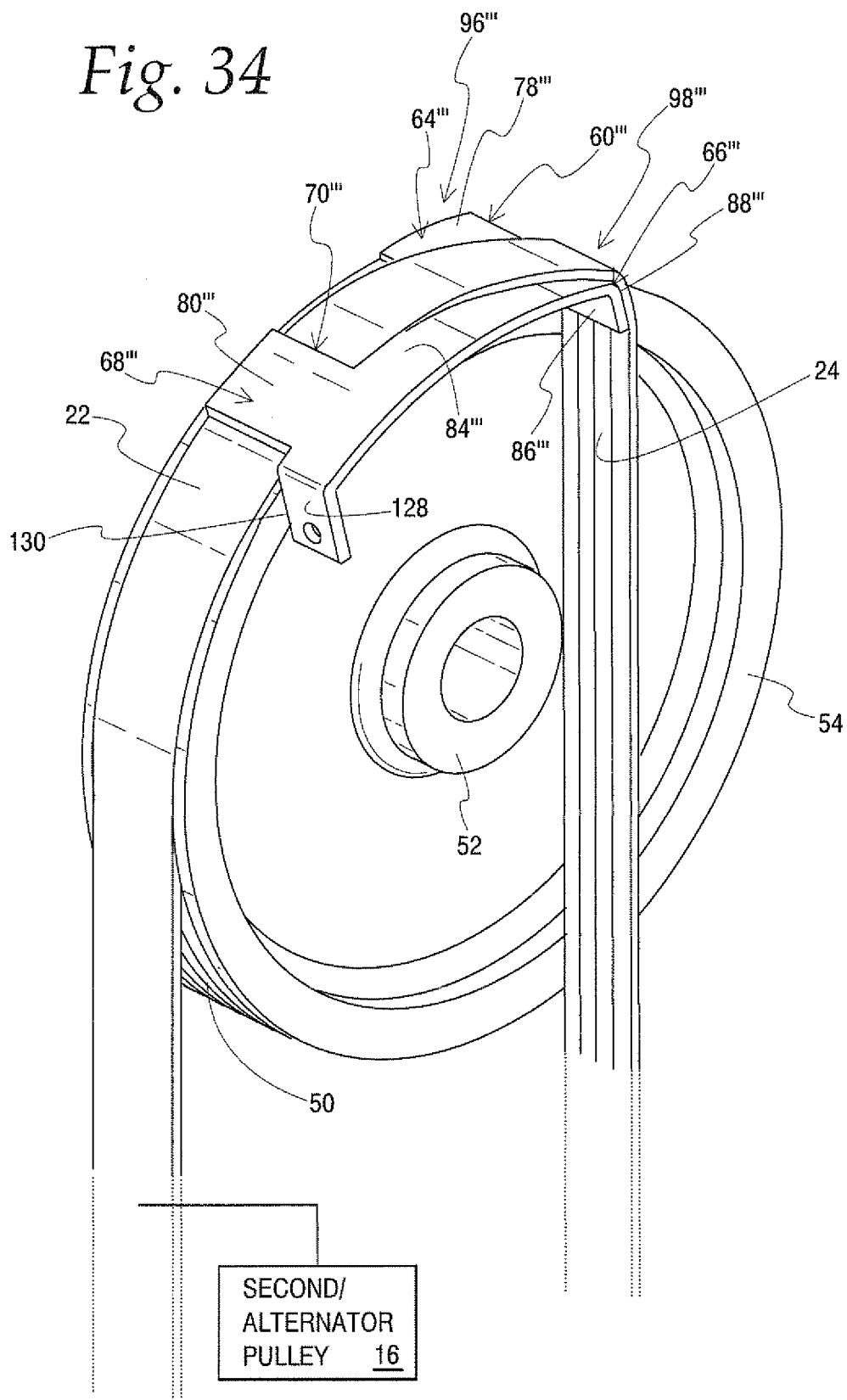
FIG. 34 is a view as in FIG. 33 with the belt installation jig and belt in an initial operating state.
Figure 40:
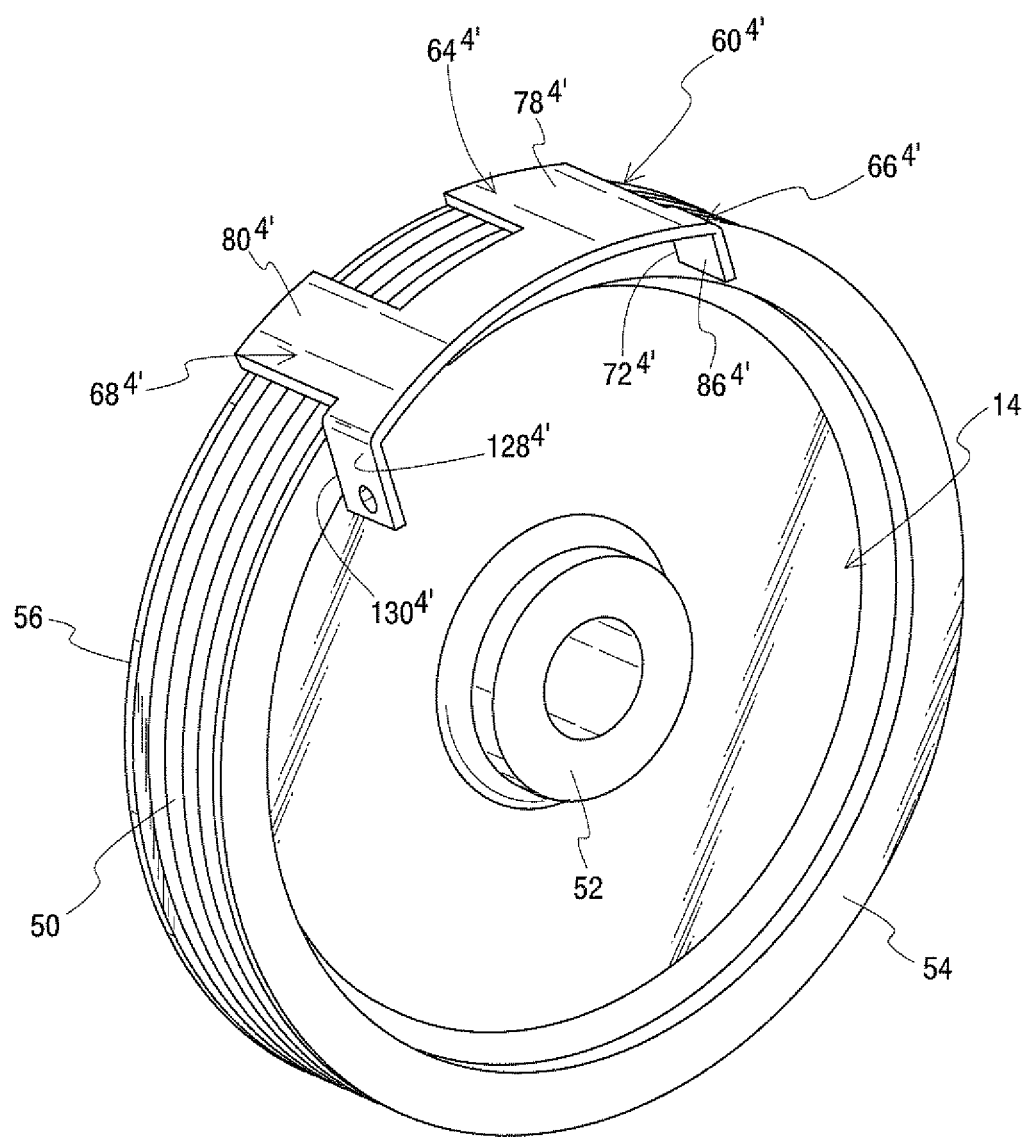
FIG. 40 is a perspective view of the belt installation jig in FIGS. 36-39 operatively associated with the first pulley on the system in FIG. 1.
Figure 41:
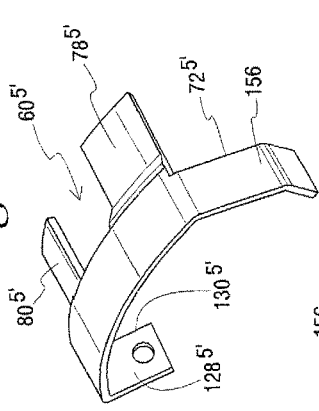
FIGS. 41-44 are different perspective views of another form of belt installation jig, according to the present invention.
Figure 42:
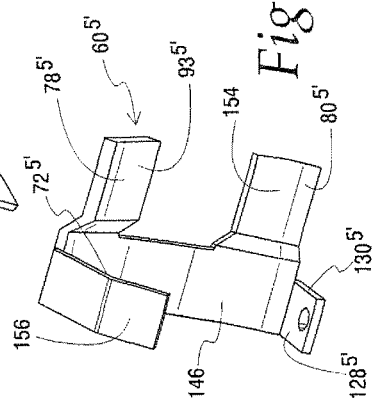
Figure 43:
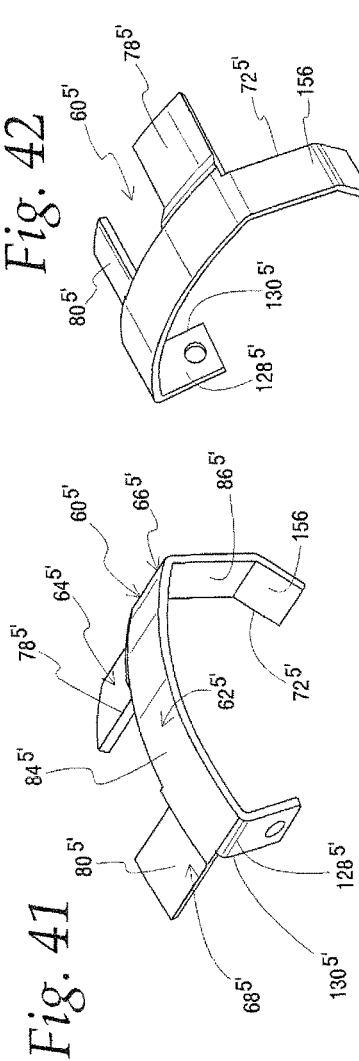
Figure 44:
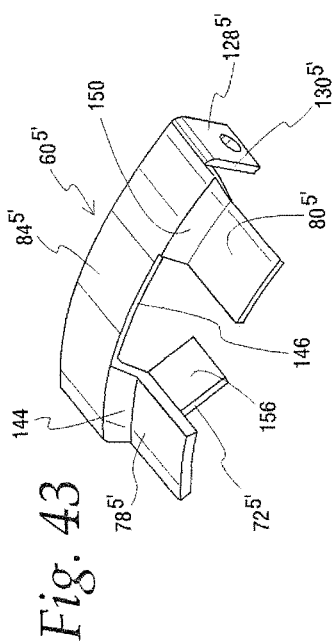
Figure 45:
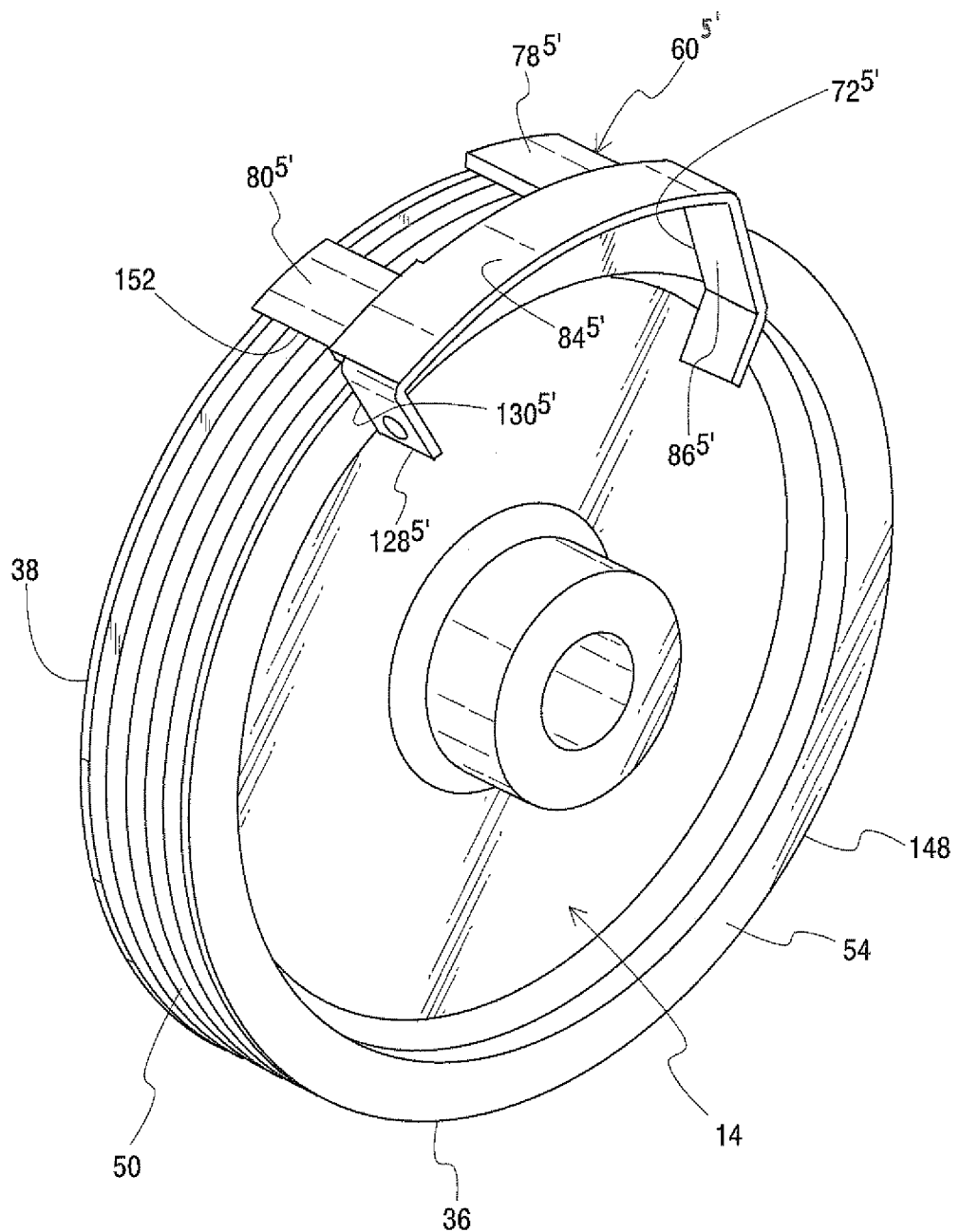
FIG. 45 is a perspective view of the belt installation jig in FIGS. 41-44 operatively associated with the first pulley on the system in FIG. 1.
Figure 50:
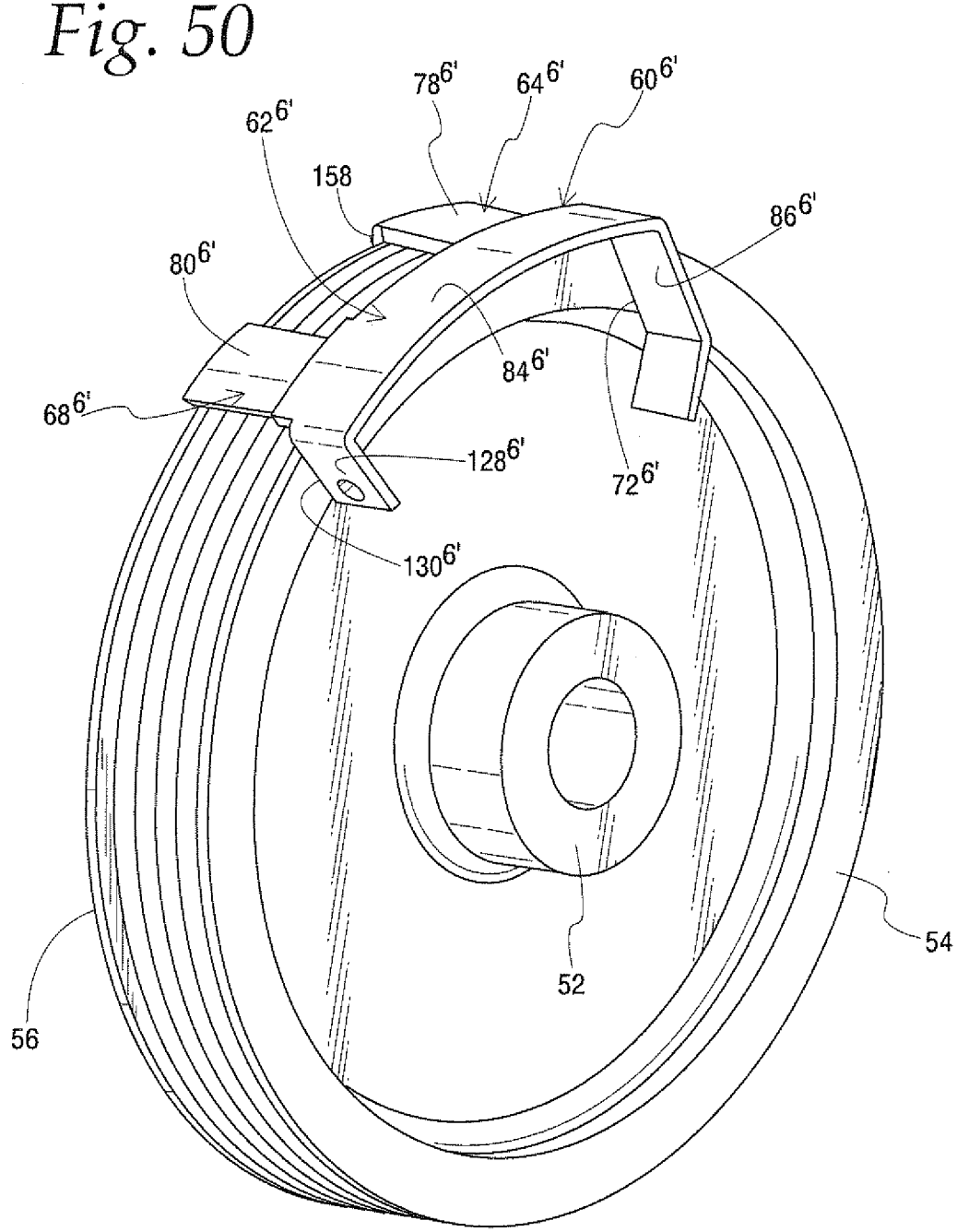
FIG. 50 is a perspective view of the belt installation jig in FIGS. 46-49 operatively associated with the first pulley on the system in FIG. 1.
Figure 55:
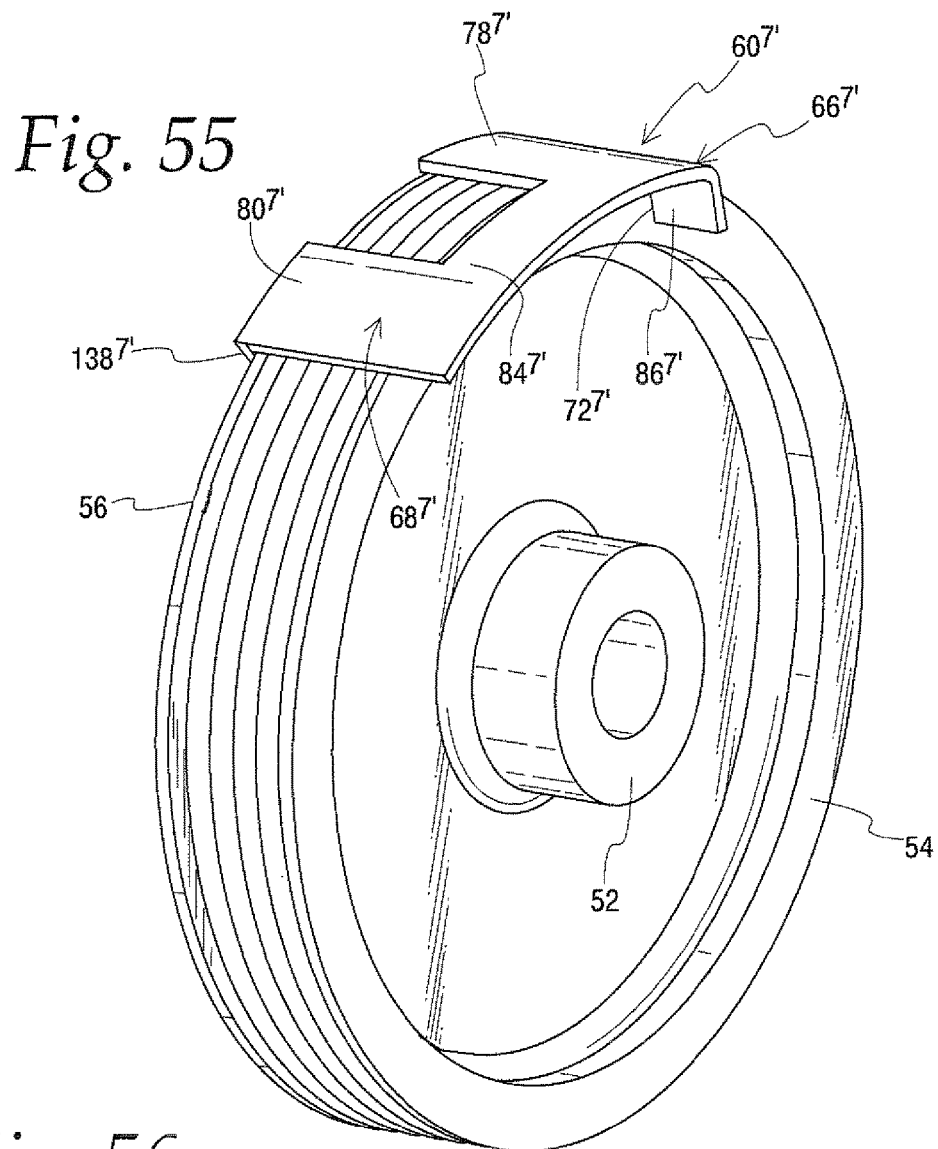
FIG. 55 is a perspective view of the belt installation jig in FIGS. 51-54 operatively associated with the first pulley on the system in FIG. 1.

The body 62" has a wall 80'" at the belt pressing part 68" that is substantially rectangular, with a slight curvature to conform to the convex curvature of the pulley 14 with which it cooperates, as shown in FIGS. 33-35.

The body 62" further has a rectangular wall 78'" at the pulley pressing part 64'". The wall 78'" is likewise curved to conform to the pulley 14.

An interconnecting wall 84'" extends between the rectangular walls 78'", 80'" and has an end 86" that is bent to reside at an angle with respect to the interconnecting wall 84". The opposite circumferential end of the interconnecting wall 84" has a similarly bent end 128.

The offset end 86" has an edge defining a surface 72'" that faces axially with respect to the pulley 14 and abuts thereto at the side surface 54. The end 128 has a like edge defining a surface 130 that is abuttable to the side surface 54 of the pulley 14 at a circumferentially spaced location.

Whereas the belt installation jig 60 has facing surfaces on axially opposite sides of the pulley 14, to respectively abut surfaces 54, 56 thereon, both of the surfaces 72", 130 reside at the same axial side of the pulley 14 adjacent to the surface 54 thereon.

With this arrangement, the belt 22 and belt installation jig 60'" can be placed in an initial operating state by moving the belt installation jig 60'" from a separated state axially in one direction to against the pulley side surface 54. More specifically, the surfaces 72', 130 are configured to simultaneously abut the side surface 54. With the belt 22 and belt installation jig 60" in the initial operating state, movement of the belt installation jig 60" oppositely to the one direction is not blocked by the pulley 14.

Further, by reason of not requiring the belt installation jig 60" to captively engage the width of the pulley 14, the belt installation jig 60" does not have to be dimensioned to match the particular pulley width and is also capable of being used with pulleys having a range of widths, with the upper range of the width potentially being greater than the axial projection of the walls 78'", 80'" from the interconnecting wall 84'". Accordingly, the belt installation jig 60'" has a potentially more universal application.

To use the belt installation jig 60'", the belt installation jig 60'" can be operatively situated as shown in FIG. 33, with the surfaces 72'", 130 abutting to the pulley side surface 54. The belt installation jig 60'" and belt 22 can then be placed in the initial operating state as shown in FIG. 34 wherein: a) the inside surface 24 of the belt 22 is wrapped against the second/alternator pulley 16 and partially operatively against the outer surface 50 of the first/crank pulley 14; b) the pulley pressing part 64'" is urged against the outer circumference 50 of the pulley 14 by the belt 22 at a first circumferential location 96'"; c) the belt 22 resides radially between the belt pressing part 68'" and the outer circumference 50 of the pulley 14; and d) the belt 22 is wrapped against a surface 88'" on the belt holding part 66'" at a second circumferential location 98'", which surface is defined cooperatively by the interconnecting wall 84'", including the end 86'" thereon. The second circumferential location 98'" is spaced in a first circumferential direction from the first circumferential location 96'" and so that the inside surface 24 of the belt 22 at the second circumferential location 98'" is spaced axially away from the outer circumference 50 of the pulley 14.

The belt 22 projects through a gap 70'" between the walls 78'", 80'" so as to reside radially inside of the belt pressing part 68'" and radially overly the pulley pressing part 64'". The belt pressing part 68'" urges the underlying portion of the belt 22 against the outer circumference 50 of the pulley 14.

In this embodiment, the belt installation jig 60" is shown formed as one piece, though that is not a requirement.

Further, the bent end 128 is shown in this embodiment with a through opening 134. A cord 136 is directed through the opening 134 and can be tied to the wrench 106 to function as a tether that prevents the belt installation jig 60''' from being fully separated from the wrench 106.

To use the belt installation jig 60 to train the belt 22 around the pulleys 14, 16, the connector 108 on the wrench 106 is coupled to the pulley 14 through the hub 52 thereon so that the pulley 14 can be turned using the wrench 106.

The belt 22 is trained around the pulley 16. The belt installation jig 60''' and belt 22 are placed in the initial operating state shown in FIG. 34 wherein the surfaces 72''', 130 are adjacent, or abut, to the pulley side surface 54, with the belt 22 partially between the belt pressing part 68''' and the pulley 14, partially hooked on the belt holding part 66''', and partially over the pulley pressing part 64'''.

In this state, the belt portion projecting from underneath the belt pressing part 68''' to over the surface 88''' is angled with respect to a plane orthogonal to the axis of the pulley 14. The process is completed by carrying out the steps previously described with respect to the earlier embodiment.

As noted above, the above-described configuration for the belt installation jig 60' lends itself to formation thereof from a single piece of iron or steel plate material that is conventionally cut and bent to the depicted shape. The one-piece construction is not a requirement.

In FIGS. 36-40, another form of belt installation jig, according to the invention, is shown at 60$^{4'}$. The belt installation jig 60$^{4'}$ is substantially the same as the belt installation jig 60''', with one variation, as described below.

The belt installation jig 60$^{4'}$ has pulley pressing and belt holding parts 64$^{4'}$, 66$^{4'}$, respectively, the same as the corresponding parts on the belt installation jig 60$^{4''}$. Additionally, the belt installation jig 60''' has an interconnecting wall 84$^{4'}$ with opposite bent ends 86$^{4'}$, 128$^{4'}$ that respectively define surfaces 72$^{4'}$, 130$^{4'}$, which components are identical to those with corresponding numbers in the belt installation jig 60'''.

On the belt installation jig 60$^{4'}$, the rectangular wall 80$^{4'}$ that makes up the belt pressing part 68$^{4'}$, has a generally orthogonally bent end 138 that defines a surface 140 facing axially oppositely to the surfaces 72$^{4'}$, 130$^{4'}$.

Through this arrangement, the width of the pulley 14 is captively maintained between the surfaces 140 and 72$^{4'}$, 130$^{4'}$. The surface 140 is arranged to facially contact the pulley side surface 56, with the surfaces 72$^{4'}$, 130$^{4'}$ configured to abut the pulley side surface 54.

The entire belt installation jig 60$^{4'}$ can be formed from a single piece, including the additional wall end 138 that defines the surface 140.

The captive arrangement between the pulley 14 and the surfaces 140 and 72$^{4'}$, 130$^{4'}$ confines movement of the belt installation jig 60$^{4'}$ in axially opposite directions relative to the pulley 14. A potentially more stable location of the belt installation jig 60$^{4'}$ results.

In FIGS. 41-45, another form of belt installation jig, according to the present invention, is shown at 60$^{5'}$. The belt installation jig 60$^{5'}$ has a body 62$^{5'}$ that defines a pulley pressing part 64$^{5'}$, a belt holding part 66$^{5'}$, and a belt pressing part 68$^{5'}$. The pulley pressing part 64$^{5'}$ and belt pressing part 68$^{5'}$ are joined through an interconnecting wall 84$^{5'}$ with opposite, circumferentially spaced, bent ends 86$^{5'}$, 128$^{5'}$.

The belt installation jig 60$^{5'}$ differs from the belt installation jig 60''' primarily through a modification that is incorporated to accommodate the pulley flange 136 that projects radially outwardly from the outer circumference 50 of the pulley 14 where the surface 54 is defined. Through this modification, the belt installation jig 60$^{5'}$ is configured to wrap around the flange 142, thereby to allow an inner surface 93$^{5'}$ on the pulley pressing part 64$^{5'}$ to be placed more closely to, or against, the pulley outer circumference 50.

To accomplish this, a transition portion 144 angles between the interconnecting wall 84$^{5'}$ and a rectangular wall 78$^{5'}$ defining the pulley pressing part 64$^{5'}$. With a radially inwardly facing surface 146 on the interconnecting wall 84$^{5'}$ abutted to the outer edge 148 of the flange 36, the rectangular wall 78$^{5'}$ is offset radially inwardly relative to the interconnecting wall 84$^{5'}$ to be adjacent to, or against, the outer circumference 50.

A like transition portion 150 is provided where the interconnecting wall 84$^{5'}$ blends into a rectangular wall 80$^{5'}$ defining the belt pressing part 68$^{5'}$. The transition portion 150 is configured so that a suitable gap at 152 is maintained between a radially inwardly facing surface 154 on the rectangular wall 80$^{5'}$ and the outer pulley circumference 50 to accommodate the thickness of the belt 22.

The axial dimensions of the rectangular walls 78$^{5'}$, 80$^{5'}$ are selected to reside fully within the width of the groove 44 between the flanges 36, 38. The rectangular wall 78$^{5'}$, 80$^{5'}$ may be made either flat or with at least the surfaces 93$^{5'}$, 154 facing radially inwardly thereon with a curvature matched at least nominally to that of the outer pulley circumference 50.

The belt installation jig 60$^{5'}$ can be made from a single piece of material that is bent to form the depicted shape.

With the described configuration, the belt installation jig 60$^{5'}$ may be stably positioned upon the pulley 14, with the rectangular walls 78$^{5'}$, 80$^{5'}$ radially closer to the outer circumference 50 than those on the jig 60'''.

Additionally, the end 86$^{5'}$ is shown with a bent portion 156 at its extremity. This configuration potentially creates a longer extent for the surface 72$^{5'}$ that, with the surface 130$^{5'}$ abuts to the side surface 54 of the pulley 14. The transition portions 144, 150 may also interact with the pulley flange 36 to limit axial shifting of the belt installation jig 60$^{5'}$ relative to the pulley 14.

In FIGS. 46-50, a further form of belt installation jig is shown at 60$^{6'}$. The belt installation jig 60$^{6'}$ is similar to the belt installation jig 60$^{5'}$, with the primary distinction being that the rectangular walls 78$^{6'}$, 80$^{6'}$ have orthogonally bent ends 158, 160, respectively. The ends 158, 160 respectively define axially facing surfaces 162, 164 to abut to the pulley side surface 56 with the belt installation jig 60$^{6'}$ operatively positioned.

The belt installation jig 60$^{6'}$ otherwise has the same basic components as the belt installation jig 60$^{5'}$; notably a pulley pressing part 64$^{6'}$, a belt holding part 66$^{6'}$, and a belt pressing part 68$^{6'}$. An interconnecting wall 84$^{6'}$ joins between rectangular walls 78$^{6'}$, 80$^{6'}$, respectively associated with the pulley pressing part 64$^{6'}$ and belt pressing part 68$^{6'}$. The interconnecting wall 84$^{6'}$ has bent ends 86$^{6'}$, 128$^{6'}$ at circumferentially spaced locations, with the ends respectively defining surfaces 72$^{6'}$, 130$^{6'}$ facing axially oppositely to the surfaces 162, 164, to abut to the pulley side surface 54. The belt installation jig 60$^{6'}$ includes transition portions 144$^{6'}$, 150$^{6'}$ where the interconnecting wall 84$^{6'}$ merges respectively into the rectangular walls 78$^{6'}$, 80$^{6'}$.

All components of the belt installation jig 60$^{6'}$ can be made from a single piece of material that is strategically formed and bent to arrive at the depicted shape.

With this arrangement, the pulley 14 becomes axially captive between the surfaces 162, 72$^{6'}$ and 164, 130$^{6'}$ at circumferentially spaced locations to add additional stability to the operatively positioned belt installation jig 60$^{6'}$.

In FIGS. 51-55, another form of belt installation jig, according to the present invention, is shown at 60$^{7'}$. The belt installation jig 60⁷' is similar to the belt installation jig 60⁴ described above with two primary distinctions. The belt installation jig 60⁷' does not have a counterpart to the bent end 128⁴' on the interconnecting wall 84⁴'. Additionally, the bent end 138⁷' depends radially further than the corresponding end 138 on the belt installation jig 60⁴'.

The belt installation jig 60⁷' otherwise has similar components; notably a pulley pressing part 64⁷', a belt holding part 66⁷', and a belt pressing part 68⁷', with an interconnecting wall 84⁷' joining between rectangular walls 78⁷', 80⁷', respectively associated with the pulley pressing part 64⁷' and belt pressing part 68⁷'. The interconnecting wall 84⁷' has a bent end 86⁷'.

With the depicted configuration, the surface 72⁷' on the bent end 86⁷' faces axially oppositely to a surface 140⁷' on the bent end 138⁷' so that the width of the pulley 14 is captively maintained therebetween.

The extended area of the surface 140⁷' affords additional stability for the operatively positioned belt installation jig 60⁷'.

All components depicted may be formed from a single piece of material that is strategically cut and bent to produce the shape shown.

Figure 56:
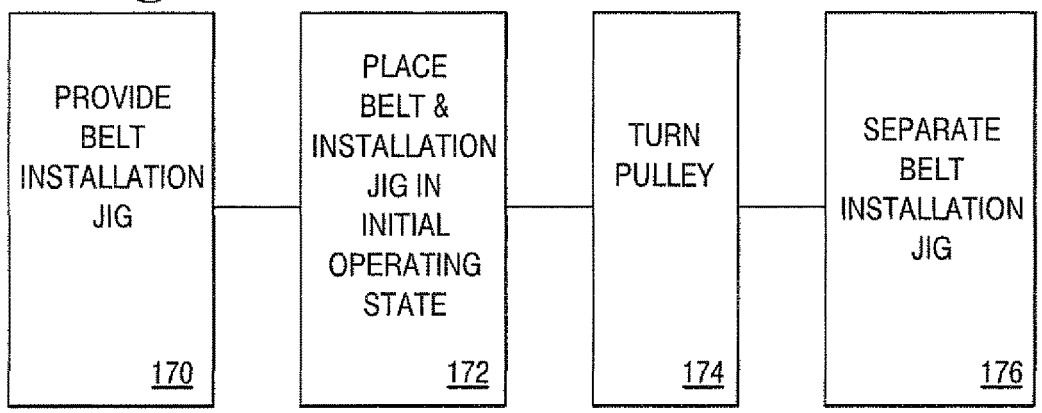
FIG. 56 is a block diagram representation of a method for placing an endless belt operatively around spaced pulleys, according to the present invention.

With the structure described above, a method of placing an endless belt with a length operatively around first and second pulleys, that are respectively mounted to turn around first and second axes and each have an outer circumference, can be carried out as shown in block diagram form in FIG. 56.

As shown at block 170, a belt installation jig is provided. As shown at block 172, the belt and belt installation jig are placed in an initial operating state wherein the belt and belt installation jig cooperate so that: a) an inside surface of the belt is operatively against the outer circumference of the second pulley and partially operatively against the outer circumference of the first pulley such that: i) the inside surface of the belt is against the outer circumference of the first pulley at a first circumferential location; and ii) the inside surface of the belt is supported by the belt installation jig to be axially spaced from the outer circumference of the first pulley at a second circumferential location.

As shown at block 174, with the belt and belt installation jig in the initial operating state, the first pulley is turned in a first circumferential direction around the first axis and thereby causes the first pulley, belt, and belt installation jig to interact so that the belt is operatively against the outer circumference of the first pulley. The pulley is further turned in the first circumferential direction so that the belt installation jig resides between the first and second pulley axes.

As shown at block 176, the belt installation jig is repositioned to be separated from the belt.

The foregoing disclosure of specific embodiments is intended to be illustrative of the broad concepts comprehended by the invention.

The invention claimed is:

1. In combination:
a) first and second pulleys that are respectively mounted to turn around spaced first and second axes,
each of the first and second pulleys having an outer circumference;
b) an endless belt having a length, an inside surface and an outside surface; and
c) a belt installation jig comprising:
a body comprising:
a pulley pressing part;
a belt holding part; and
a belt pressing part, the belt installation jig and belt in an initial operating state with: i) the inside surface of the belt wrapped operatively against the outer circumference of the second pulley and partially operatively against the outer circumference of the first pulley; ii) the pulley pressing part urged against the outer circumference of the first pulley by the belt at a first circumferential location; iii) the belt residing between the belt pressing part and the outer circumference of the first pulley; and iv) the belt wrapped against the belt holding part at a second circumferential location spaced in a first circumferential direction from the first circumferential location so that the inside surface of the belt is spaced axially away from the outer circumference of the first pulley, the belt installation jig and belt configured so that with the belt installation jig and belt in the initial operating state, turning of the first pulley around the first axis in the first circumferential direction causes the belt installation jig to move: i) around the first axis so as to guide the inside surface of the belt fully operatively against the outer circumference of the first pulley; and ii) to a release location between the first and second pulley axes, the belt installation jig movable radially outwardly relative to the first pulley, the first pulley, belt installation jig and belt cooperating so that the belt confines radial movement of the belt installation jig relative to the first pulley as the belt installation jig moves from one location the belt installation jig resides at with the belt installation jig and belt in the initial operating state to the release location, the first pulley, belt installation jig, and belt cooperating so that the belt installation jig moves radially outwardly away from the pulley to be fully separated from the first pulley as an incident of the belt installation jig moving from the one location to the release location in response to turning of the first pulley around the first axis in the first direction.

2. The combination according to claim 1 wherein the body comprises a main part and a discrete pad attached to the main part at the pulley pressing part that directly engages the outer circumference of the first pulley with the belt installation jig and belt in the initial operating state.

3. The combination according to claim 2 wherein the main body comprises a first material and the discrete pad is at least one of: a) made from a second material that is capable of generating a greater frictional force upon the outer circumference of the first pulley than the first material; and b) treated to generate a greater frictional force upon the outer circumference of the first pulley.

4. The combination according to claim 1 wherein the first pulley has a groove between axially facing first and second flange surfaces and the pulley pressing part resides between the facing first and second flange surfaces with the belt installation jig and belt in the initial operating state.

5. The combination according to claim 4 wherein the inside surface of the belt has a plurality of ribs and recesses extending along the length of the belt, the outer circumference of the first pulley has a shape that is complementary to the ribs and recesses between the facing first and second flange surfaces, and the pulley pressing part has a shape that is complementary to the shape of the outer circumference of the first pulley between the facing first and second flange surfaces.

6. The combination according to claim 4 wherein the outer circumference of the first pulley is convexly curved and the pulley pressing part has a surface that directly engages the outer circumference of the first pulley and is curved to be complementary to the convexly curved outer circumference of the first pulley.

7. The combination according to claim 4 wherein the body comprises a main part and a discrete pad attached to the main part at the pulley pressing part that directly engages the outer circumference of the first pulley and resides between the facing first and second flange surfaces with the belt installation jig and belt in the initial operating state.

8. The combination according to claim 4 wherein the body comprises a main part that is bent against itself to define an abutting part that directly engages the outer circumference of the first pulley and resides between the facing first and second flange surfaces with the belt installation jig in the initial operating state.

9. The combination according to claim 1 wherein the first pulley has axially oppositely facing first and second surfaces and the body comprises first and second facing surfaces that are abuttable respectively to the first and second pulley surfaces to limit relative movement of the body in axially opposite direction relative to the first pulley, with the belt and belt installation jig in the initial operating state.

10. The combination according to claim 9 wherein the body comprises a third surface that is spaced circumferentially from the first surface on the body and is abuttable to the first axially facing pulley surface.

11. The combination according to claim 10 wherein the body comprises a fourth surface that is spaced circumferentially from the second surface on the body and is abuttable to the second axially facing pulley surface.

12. The combination according to claim 9 wherein the first and second body surfaces are spaced circumferentially from each other.

13. The combination according to claim 9 wherein the first surface on the body is defined at the belt pressing part and the second surface on the body is defined at the belt holding part.

14. The combination according to claim 1 wherein the first pulley has axially oppositely facing surfaces and the body has at least one surface that is abuttable to one of the axially oppositely facing surfaces on the first pulley to limit movement of the belt installation jig in one axial direction relative to the first pulley with the belt and belt installation jig in the initial operating state and with the belt and belt installation jig in the initial operating state the belt installation jig can be moved axially oppositely to the one direction without being blocked by the first pulley.

15. The combination according to claim 1 wherein the first pulley has a circumferential groove for receiving the belt and the belt installation jig comprises a wall that is radially offset to reside within the circumferential groove with the belt and belt installation jig in the initial operating state.

16. The combination according to claim 15 wherein the body has a single piece that defines the entirety of the belt installation jig.

17. The combination according to claim 1 wherein the belt holding part defines a convexly curved surface against which the inside surface of the belt abuts with the belt installation jig and belt in the initial operating state.

18. The combination according to claim 1 wherein the body comprises a main part and a discrete pad attached to the main part at the belt pressing part that directly engages the belt.

19. The combination according to claim 1 wherein the pulley pressing part resides circumferentially between the belt holding part and belt pressing part.

20. The combination according to claim 19 wherein there is a circumferential gap between the belt pressing part and the pulley pressing part through which the belt projects with the belt installation jig and belt in the initial operating state.

21. The combination according to claim 1, wherein the belt installation jig is movable axially relative to the first pulley.

22. A belt installation jig for placing an endless belt with a length around first and second pulleys, each with an outer circumference, that are respectively mounted to turn around first and second spaced axes, the belt installation jig placeable in operative relationship with the belt and pulleys and in the operative relationship comprising:
 a body comprising:
  (a) a pulley pressing part urged against the outer circumference of the first pulley by the belt;
  (b) a belt holding part against which the belt is wrapped so that the belt is spaced axially away from the outer circumference of the first pulley; and
  (c) a belt pressing part that presses a portion of the belt against the outer circumference of the first pulley,
  the belt installation jig, first pulley and belt configured so that the belt installation jig is movable radially relative to the first pulley with the belt installation jig in operative relationship with the belt and pulley.

23. The belt installation jig according to claim 22 wherein the belt installation jig is configured to be maintained in operative relationship with the pulleys and belt only by captive interaction between the belt installation jig, the belt and the pulleys.

24. The belt installation jig according to claim 22 wherein the body comprises a main part and a discrete pad attached to the main part at the pulley pressing part that directly engages the outer circumference of the first pulley with the belt installation jig in operative relationship with the belt and pulleys.

25. The belt installation jig according to claim 24 wherein the main body comprises a first material and the discrete pad is at least one of: a) made from a second material that is capable of generating a greater frictional force upon the outer circumference of the first pulley than the first material; and b) treated to generate a greater frictional force upon the outer circumference of the first pulley with the belt installation jig in operative relationship with the belt and pulleys.

26. The belt installation jig according to claim 22 wherein the first pulley has a groove between axially facing first and second flange surfaces and the pulley pressing part resides between the facing first and second flange surfaces with the belt installation jig in operative relationship with the belt and pulleys.

27. The belt installation jig according to claim 26 wherein the belt has an inside surface with a plurality of ribs and recesses extending along the length of the belt, the outer circumference of the first pulley has a shape that is complementary to the ribs and recesses between the facing first and second flange surfaces, and the pulley pressing part has a shape that is complementary to the shape of the outer circumference of the first pulley between the facing first and second flange surfaces.

28. The belt installation jig according to claim 27 wherein the body comprises a main part and a discrete pad attached to the main part at the pulley pressing part that directly engages the outer circumference of the first pulley and resides between the facing first and second flange surfaces with the belt installation jig in operative relationship with the belt and pulleys.

29. The belt installation jig according to claim 26 wherein the pulley pressing part has a surface that directly engages the outer circumference of the first pulley and is curved to be complementary to the outer circumference of the first pulley with the belt installation jig in operative relationship with the belt and pulleys.

30. The belt installation jig according to claim 26 wherein the body comprises a main part that is bent against itself to define an abutting part that directly engages the outer circumference of the first pulley with the belt installation jig in operative relationship with the belt and pulleys.

31. The belt installation jig according to claim 22 wherein the first pulley has axially oppositely facing surfaces and the body comprises first and second facing surfaces that are abuttable respectively to the first and second pulley surfaces to limit relative movement of the body in axially opposite direction relative to the first pulley with the belt installation jig in operative relationship with the belt and pulleys.

32. The belt installation jig according to claim 31 wherein the first surface on the body is defined at the belt pressing part and the second surface on the body is defined at the belt holding part.

33. The belt installation jig according to claim 22 wherein the belt holding part defines a convexly curved surface against which an inside surface of the belt abuts with the belt installation jig in operative relationship with the belt and pulleys.

34. The belt installation jig according to claim 22 wherein the body comprises a main part and a discrete pad attached to the main part at the belt pressing part that directly engages the belt with the belt installation jig in operative relationship with the belt and pulleys.

35. The belt installation jig according to claim 22 wherein the pulley pressing part resides circumferentially between the belt holding part and belt pressing part.

36. The belt installation jig according to claim 35 wherein there is a circumferential gap between the belt pressing part and the pulley pressing part through which the belt projects with the belt installation jig in operative relationship with the belt and pulleys.

\* \* \* \* \*